United States Patent
Abbott et al.

(10) Patent No.: US 7,945,859 B2
(45) Date of Patent: May 17, 2011

(54) INTERFACE FOR EXCHANGING CONTEXT DATA

(75) Inventors: Kenneth H. Abbott, Kirkland, WA (US); Steven J. Fluegel, Hastings, MN (US); Joshua M. Freedman, Mercer Island, WA (US); Dan Newell, Medina, WA (US); James O. Robarts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/336,581

(22) Filed: Dec. 17, 2008

(65) Prior Publication Data

US 2009/0094524 A1 Apr. 9, 2009

Related U.S. Application Data

(63) Continuation of application No. 11/075,529, filed on Mar. 8, 2005, now Pat. No. 7,478,331, which is a continuation of application No. 09/692,507, filed on Oct. 19, 2000, now Pat. No. 6,920,616, which is a continuation-in-part of application No. 09/541,328, filed on Apr. 2, 2000, now abandoned, and a continuation-in-part of application No. 09/541,326, filed on Apr. 2, 2000, now abandoned, and a continuation-in-part of application No. 09/216,193, filed on Dec. 18, 1998, now Pat. No. 6,466,232.

(51) Int. Cl.
*G06F 3/00* (2006.01)
*G06F 17/00* (2006.01)

(52) U.S. Cl. ............ 715/740; 715/744; 709/201; 706/45

(58) Field of Classification Search .......... 715/736–648, 715/740–748, 866; 709/201, 223, 224; 706/45, 706/61

See application file for complete search history.

(56) References Cited

U.S. PATENT DOCUMENTS

| | | | |
|---|---|---|---|
| 3,973,251 A | 8/1976 | Stephans | |
| 4,283,712 A | 8/1981 | Goody | |
| 4,458,331 A | 7/1984 | Amezcua et al. | |
| 4,569,026 A | 2/1986 | Best | |
| 4,815,030 A | 3/1989 | Cross et al. | |
| 4,905,163 A * | 2/1990 | Garber et al. | 706/55 |
| 4,916,441 A | 4/1990 | Gombrich | |
| 4,970,683 A | 11/1990 | Harshaw et al. | |

(Continued)

FOREIGN PATENT DOCUMENTS

EP 0661627 A1 * 7/1995

(Continued)

OTHER PUBLICATIONS

Affective Understanding: Modeling and Responding to User Affect. Http://www.media.mit.edu/affect/AC_research/understanding.html. Last accessed Oct. 2, 1998, pp. 1-3.

(Continued)

*Primary Examiner* — Tadeese Hailu
(74) *Attorney, Agent, or Firm* — Wolf, Greenfield & Sacks, P.C.

(57) ABSTRACT

A facility for exchanging context attributes is described. A characterization module receives an invocation request to provide an attribute value that was generated by a requesting attribute consumer. The received invocation request identifies the attribute whose value is to be provided. In response to receiving the invocation request, the characterization module provides a value for the identified attribute to the requesting attribute consumer.

20 Claims, 10 Drawing Sheets

| | context server name | version | installation date | filename | request handler |
|---|---|---|---|---|---|
| 401 | gps | 1.00.315 | 2/10/2000 | gps.exe | (reference) |
| 402 | ips | 1.00.315 | 2/21/2000 | ips.exe | (reference) |
| 403 | location_region_analysis | 1.00.315 | 2/10/2000 | l_r_a.exe | (reference) |
| | 411 | 412 | 413 | 414 | 415 | context server table 400

U.S. PATENT DOCUMENTS

| | | |
|---|---|---|
| 4,991,087 A | 2/1991 | Burkowski et al. |
| 5,032,083 A | 7/1991 | Friedman |
| 5,133,075 A | 7/1992 | Risch |
| 5,201,034 A | 4/1993 | Matsuura et al. |
| 5,208,449 A | 5/1993 | Eastman et al. |
| 5,214,757 A | 5/1993 | Mauney et al. |
| 5,227,614 A | 7/1993 | Danielson et al. |
| 5,237,684 A | 8/1993 | Record et al. |
| 5,251,294 A | 10/1993 | Abelow |
| 5,267,147 A | 11/1993 | Harshaw et al. |
| 5,278,946 A | 1/1994 | Shimada et al. |
| 5,285,398 A | 2/1994 | Janik |
| 5,317,568 A | 5/1994 | Bixby et al. |
| 5,327,529 A | 7/1994 | Fults et al. |
| 5,335,276 A | 8/1994 | Thompson et al. |
| 5,353,399 A | 10/1994 | Kuwamoto et al. |
| 5,388,198 A | 2/1995 | Layman et al. |
| 5,398,021 A | 3/1995 | Moore |
| 5,416,730 A | 5/1995 | Lookofsky |
| 5,454,074 A | 9/1995 | Hartel et al. |
| 5,470,233 A | 11/1995 | Fruchterman et al. |
| 5,471,629 A | 11/1995 | Risch |
| 5,481,667 A | 1/1996 | Bieniek et al. |
| 5,493,692 A | 2/1996 | Theimer et al. |
| 5,506,580 A | 4/1996 | Whiting et al. |
| 5,513,646 A | 5/1996 | Lehrman et al. |
| 5,522,026 A | 5/1996 | Records et al. |
| 5,535,323 A | 7/1996 | Miller et al. |
| 5,537,618 A | 7/1996 | Boulton et al. |
| 5,539,665 A | 7/1996 | Lamming et al. |
| 5,544,321 A | 8/1996 | Theimer et al. |
| 5,553,609 A | 9/1996 | Chen et al. |
| 5,555,376 A | 9/1996 | Theimer et al. |
| 5,559,520 A | 9/1996 | Barzegar et al. |
| 5,560,012 A | 9/1996 | Ryu et al. |
| 5,566,337 A | 10/1996 | Szymanski et al. |
| 5,568,645 A | 10/1996 | Morris et al. |
| 5,572,401 A | 11/1996 | Carroll |
| 5,592,664 A | 1/1997 | Starkey |
| 5,601,435 A | 2/1997 | Quy |
| 5,603,054 A | 2/1997 | Theimer et al. |
| 5,611,050 A | 3/1997 | Theimer et al. |
| 5,642,303 A | 6/1997 | Small et al. |
| 5,646,629 A | 7/1997 | Loomis et al. |
| 5,659,746 A | 8/1997 | Bankert et al. |
| 5,675,358 A | 10/1997 | Bullock et al. |
| 5,689,619 A | 11/1997 | Smyth |
| 5,689,708 A | 11/1997 | Regnier et al. |
| 5,701,894 A | 12/1997 | Cherry et al. |
| 5,704,366 A | 1/1998 | Tacklind et al. |
| 5,710,884 A | 1/1998 | Dedrick |
| 5,715,451 A | 2/1998 | Marlin |
| 5,717,747 A | 2/1998 | Boyle et al. |
| 5,719,744 A | 2/1998 | Jenkins et al. |
| 5,726,660 A | 3/1998 | Purdy et al. |
| 5,726,688 A | 3/1998 | Siefert et al. |
| 5,738,102 A | 4/1998 | Lemelson |
| 5,740,037 A | 4/1998 | McCann et al. |
| 5,742,279 A | 4/1998 | Yamamoto et al. |
| 5,745,110 A | 4/1998 | Ertemalp |
| 5,751,260 A | 5/1998 | Nappi et al. |
| 5,752,019 A | 5/1998 | Rigoutsos et al. |
| 5,754,938 A | 5/1998 | Herz et al. |
| 5,761,662 A | 6/1998 | Dasan |
| 5,769,085 A | 6/1998 | Kawakami et al. |
| 5,781,913 A | 7/1998 | Felsenstein et al. |
| 5,787,234 A | 7/1998 | Molloy |
| 5,787,279 A | 7/1998 | Rigoutsos |
| 5,790,974 A | 8/1998 | Tognazzini |
| 5,796,952 A | 8/1998 | Davis et al. |
| 5,798,733 A | 8/1998 | Ethridge |
| 5,806,079 A | 9/1998 | Rivette et al. |
| 5,812,865 A | 9/1998 | Theimer et al. |
| 5,818,446 A | 10/1998 | Bertram et al. |
| 5,826,253 A | 10/1998 | Bredenberg |
| 5,831,594 A | 11/1998 | Tognazzini et al. |
| 5,832,296 A | 11/1998 | Wang et al. |
| 5,835,087 A | 11/1998 | Herz et al. |
| 5,852,814 A | 12/1998 | Allen |
| 5,867,171 A | 2/1999 | Murata et al. |
| 5,873,070 A | 2/1999 | Bunte et al. |
| 5,878,274 A | 3/1999 | Kono et al. |
| 5,879,163 A | 3/1999 | Brown et al. |
| 5,881,231 A | 3/1999 | Takagi et al. |
| 5,899,963 A | 5/1999 | Hutchings |
| 5,902,347 A | 5/1999 | Backman et al. |
| 5,905,492 A | 5/1999 | Straub et al. |
| 5,910,799 A | 6/1999 | Carpenter et al. |
| 5,911,132 A | 6/1999 | Sloane |
| 5,913,030 A | 6/1999 | Lotspiech et al. |
| 5,924,074 A | 7/1999 | Evans |
| 5,937,160 A | 8/1999 | Davis et al. |
| 5,938,721 A | 8/1999 | Dussell et al. |
| 5,942,986 A | 8/1999 | Shabot et al. |
| 5,945,988 A | 8/1999 | Williams et al. |
| 5,948,041 A | 9/1999 | Abo et al. |
| 5,953,718 A | 9/1999 | Wical |
| 5,959,611 A | 9/1999 | Smailagic et al. |
| 5,963,914 A | 10/1999 | Skinner et al. |
| 5,966,126 A | 10/1999 | Szabo |
| 5,966,533 A | 10/1999 | Moody |
| 5,966,710 A | 10/1999 | Burrows |
| 5,971,580 A | 10/1999 | Hall et al. |
| 5,974,262 A | 10/1999 | Fuller et al. |
| 5,977,968 A | 11/1999 | LeBlanc |
| 5,983,335 A | 11/1999 | Dwyer, III |
| 5,991,687 A | 11/1999 | Hale et al. |
| 5,991,735 A | 11/1999 | Gerace |
| 5,995,956 A | 11/1999 | Nguyen |
| 5,999,932 A | 12/1999 | Paul |
| 5,999,943 A | 12/1999 | Nori et al. |
| 5,999,975 A * | 12/1999 | Kittaka et al. ............... 709/224 |
| 6,003,082 A | 12/1999 | Gampper et al. |
| 6,006,251 A | 12/1999 | Toyouchi et al. |
| 6,012,152 A | 1/2000 | Douik et al. |
| 6,014,638 A | 1/2000 | Burge et al. |
| 6,023,729 A | 2/2000 | Samuel et al. |
| 6,031,455 A | 2/2000 | Grube et al. |
| 6,035,264 A | 3/2000 | Donaldson et al. |
| 6,041,331 A | 3/2000 | Weiner et al. |
| 6,041,365 A | 3/2000 | Kleinerman |
| 6,044,415 A | 3/2000 | Futral et al. |
| 6,047,301 A | 4/2000 | Bjorklund et al. |
| 6,047,327 A | 4/2000 | Tso et al. |
| 6,055,516 A | 4/2000 | Johnson et al. |
| 6,061,610 A | 5/2000 | Boer |
| 6,061,660 A | 5/2000 | Eggleston et al. |
| 6,064,943 A | 5/2000 | Clark, Jr. et al. |
| 6,067,084 A | 5/2000 | Fado et al. |
| 6,081,814 A | 6/2000 | Mangat et al. |
| 6,085,086 A | 7/2000 | La Porta et al. |
| 6,088,689 A | 7/2000 | Kohn et al. |
| 6,091,411 A | 7/2000 | Straub et al. |
| 6,092,101 A | 7/2000 | Birrell et al. |
| 6,094,625 A | 7/2000 | Ralston |
| 6,098,065 A | 8/2000 | Skillen et al. |
| 6,105,063 A | 8/2000 | Hayes, Jr. |
| 6,108,197 A | 8/2000 | Janik |
| 6,108,665 A | 8/2000 | Bair et al. |
| 6,112,246 A | 8/2000 | Horbal et al. |
| 6,122,348 A | 9/2000 | French-St. George et al. |
| 6,122,657 A | 9/2000 | Hoffman, Jr. et al. |
| 6,122,960 A | 9/2000 | Hutchings et al. |
| 6,127,990 A | 10/2000 | Zwern |
| 6,128,663 A | 10/2000 | Thomas |
| 6,131,067 A | 10/2000 | Girerd et al. |
| 6,134,532 A | 10/2000 | Lazarus et al. |
| 6,154,745 A | 11/2000 | Kari et al. |
| 6,155,960 A | 12/2000 | Roberts et al. |
| 6,164,541 A | 12/2000 | Dougherty et al. |
| 6,169,976 B1 | 1/2001 | Colosso |
| 6,185,534 B1 | 2/2001 | Breese et al. |
| 6,188,399 B1 | 2/2001 | Voas et al. |
| 6,195,622 B1 | 2/2001 | Altschuler et al. |
| 6,198,394 B1 | 3/2001 | Jacobsen et al. |
| 6,199,099 B1 | 3/2001 | Gershman et al. |
| 6,199,102 B1 | 3/2001 | Cobb |

| | | |
|---|---|---|
| 6,215,405 B1 | 4/2001 | Handley et al. |
| 6,218,958 B1 | 4/2001 | Eichstaedt et al. |
| 6,230,111 B1 | 5/2001 | Mizokawa |
| 6,236,768 B1 | 5/2001 | Rhodes et al. |
| 6,256,633 B1 | 7/2001 | Dharap |
| 6,262,720 B1 | 7/2001 | Jeffrey et al. |
| 6,263,268 B1 | 7/2001 | Nathanson |
| 6,263,317 B1 | 7/2001 | Sharp et al. |
| 6,272,470 B1 | 8/2001 | Teshima |
| 6,272,507 B1 | 8/2001 | Pirolli et al. |
| 6,282,517 B1 | 8/2001 | Wolfe et al. |
| 6,285,757 B1 | 9/2001 | Carroll et al. |
| 6,285,889 B1 | 9/2001 | Nykanen et al. |
| 6,289,316 B1 | 9/2001 | Aghili et al. |
| 6,289,513 B1 | 9/2001 | Bentwich |
| 6,292,796 B1 | 9/2001 | Drucker et al. |
| 6,294,953 B1 | 9/2001 | Steeves |
| 6,301,609 B1 | 10/2001 | Aravamudan et al. |
| 6,305,007 B1 | 10/2001 | Mintz |
| 6,305,221 B1 | 10/2001 | Hutchings |
| 6,308,203 B1 | 10/2001 | Itabashi et al. |
| 6,311,162 B1 | 10/2001 | Reichwein et al. |
| 6,314,384 B1 | 11/2001 | Goetz |
| 6,317,718 B1 | 11/2001 | Fano |
| 6,321,158 B1 | 11/2001 | DeLorme et al. |
| 6,321,279 B1 | 11/2001 | Bonola |
| 6,324,569 B1 | 11/2001 | Ogilvie et al. |
| 6,327,535 B1 | 12/2001 | Evans et al. |
| 6,349,307 B1 | 2/2002 | Chen |
| 6,353,398 B1 | 3/2002 | Amin et al. |
| 6,353,823 B1 | 3/2002 | Kumar |
| 6,356,905 B1 | 3/2002 | Gershman et al. |
| 6,363,377 B1 | 3/2002 | Kravets et al. |
| 6,385,589 B1 | 5/2002 | Trusheim et al. |
| 6,392,670 B1 | 5/2002 | Takeuchi et al. |
| 6,401,085 B1 | 6/2002 | Gershman et al. |
| 6,405,159 B2 | 6/2002 | Bushey et al. |
| 6,405,206 B1 | 6/2002 | Kayahara |
| 6,418,424 B1 | 7/2002 | Hoffberg et al. |
| 6,421,700 B1 | 7/2002 | Holmes et al. |
| 6,427,142 B1 | 7/2002 | Zachary et al. |
| 6,430,531 B1 | 8/2002 | Polish |
| 6,438,618 B1 | 8/2002 | Lortz et al. |
| 6,442,549 B1 | 8/2002 | Schneider |
| 6,442,589 B1 | 8/2002 | Takahashi et al. |
| 6,442,620 B1 | 8/2002 | Thatte et al. |
| 6,446,076 B1 | 9/2002 | Burkey et al. |
| 6,446,109 B2 | 9/2002 | Gupta |
| 6,460,036 B1 | 10/2002 | Herz |
| 6,462,759 B1 | 10/2002 | Kurtzberg et al. |
| 6,466,232 B1 | 10/2002 | Newell et al. |
| 6,477,117 B1 | 11/2002 | Narayanaswami et al. |
| 6,483,485 B1 | 11/2002 | Huang et al. |
| 6,484,200 B1 | 11/2002 | Angal et al. |
| 6,487,552 B1 | 11/2002 | Lei et al. |
| 6,490,579 B1 | 12/2002 | Gao et al. |
| 6,505,196 B2 | 1/2003 | Drucker et al. |
| 6,507,567 B1 | 1/2003 | Willars |
| 6,507,845 B1 | 1/2003 | Cohen et al. |
| 6,513,046 B1 | 1/2003 | Abbott et al. |
| 6,519,552 B1 | 2/2003 | Sampath et al. |
| 6,526,035 B1 | 2/2003 | Atarius et al. |
| 6,529,723 B1 | 3/2003 | Bentley |
| 6,539,336 B1 | 3/2003 | Vock et al. |
| 6,542,889 B1 | 4/2003 | Aggarwal et al. |
| 6,546,425 B1 | 4/2003 | Hanson et al. |
| 6,546,554 B1 | 4/2003 | Schmidt et al. |
| 6,549,915 B2 | 4/2003 | Abbott et al. |
| 6,549,944 B1 | 4/2003 | Weinberg et al. |
| 6,553,336 B1 | 4/2003 | Johnson et al. |
| 6,563,430 B1 | 5/2003 | Kemink et al. |
| 6,568,595 B1 | 5/2003 | Russell et al. |
| 6,571,279 B1 | 5/2003 | Herz et al. |
| 6,578,019 B1 | 6/2003 | Suda et al. |
| 6,615,197 B1 | 9/2003 | Chai |
| 6,625,135 B1 | 9/2003 | Johnson et al. |
| 6,636,831 B1 | 10/2003 | Profit et al. |
| 6,643,684 B1 | 11/2003 | Malkin et al. |
| 6,652,283 B1 | 11/2003 | Van Schaack et al. |
| 6,661,437 B1 | 12/2003 | Miller et al. |
| 6,672,506 B2 | 1/2004 | Swartz et al. |
| 6,697,836 B1 | 2/2004 | Kawano et al. |
| 6,704,722 B2 | 3/2004 | Wang Baldonado |
| 6,704,785 B1 | 3/2004 | Koo et al. |
| 6,704,812 B2 | 3/2004 | Bakke et al. |
| 6,707,476 B1 | 3/2004 | Hochstedler |
| 6,712,615 B2 | 3/2004 | Martin |
| 6,714,977 B1 | 3/2004 | Fowler et al. |
| 6,738,040 B2 | 5/2004 | Jahn et al. |
| 6,738,759 B1 | 5/2004 | Wheeler et al. |
| 6,741,188 B1 | 5/2004 | Miller et al. |
| 6,741,610 B1 | 5/2004 | Volftsun et al. |
| 6,747,675 B1 | 6/2004 | Abbott et al. |
| 6,751,620 B2 | 6/2004 | Orbanes et al. |
| 6,766,245 B2 | 7/2004 | Padmanabhan |
| D494,584 S | 8/2004 | Schlieffers et al. |
| 6,791,580 B1 | 9/2004 | Abbott et al. |
| 6,795,806 B1 | 9/2004 | Lewis et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,834,195 B2 | 12/2004 | Brandenberg et al. |
| 6,834,208 B2 | 12/2004 | Gonzales et al. |
| 6,837,436 B2 | 1/2005 | Swartz et al. |
| 6,842,877 B2 | 1/2005 | Robarts et al. |
| 6,853,966 B2 | 2/2005 | Bushey et al. |
| 6,868,525 B1 | 3/2005 | Szabo |
| 6,874,017 B1 | 3/2005 | Inoue et al. |
| 6,874,127 B2 | 3/2005 | Newell et al. |
| 6,885,734 B1 | 4/2005 | Eberle et al. |
| 6,899,539 B1 | 5/2005 | Stallman et al. |
| 6,963,899 B1 | 11/2005 | Fernandez et al. |
| 6,968,333 B2 | 11/2005 | Abbott et al. |
| 7,000,187 B2 | 2/2006 | Messinger et al. |
| 7,010,501 B1 | 3/2006 | Roslak et al. |
| 7,010,603 B2 | 3/2006 | Martin, Jr. et al. |
| 7,040,541 B2 | 5/2006 | Swartz et al. |
| 7,046,263 B1 | 5/2006 | Abbott et al. |
| 7,055,101 B2 | 5/2006 | Abbott et al. |
| 7,058,893 B2 | 6/2006 | Abbott et al. |
| 7,058,894 B2 | 6/2006 | Abbott et al. |
| 7,062,715 B2 | 6/2006 | Abbott et al. |
| 7,063,263 B2 | 6/2006 | Swartz et al. |
| 7,076,737 B2 | 7/2006 | Abbott et al. |
| 7,080,322 B2 | 7/2006 | Abbott et al. |
| 7,089,497 B2 | 8/2006 | Abbott et al. |
| 7,096,253 B2 | 8/2006 | Vinson et al. |
| 7,103,806 B1 | 9/2006 | Horvitz |
| 7,107,539 B2 | 9/2006 | Abbott et al. |
| 7,110,764 B1 | 9/2006 | Blair et al. |
| 7,120,558 B2 | 10/2006 | McIntyre et al. |
| 7,124,125 B2 | 10/2006 | Cook et al. |
| 7,137,069 B2 | 11/2006 | Abbott et al. |
| 7,155,456 B2 | 12/2006 | Abbott, III et al. |
| 7,162,473 B2 | 1/2007 | Dumais et al. |
| 7,171,378 B2 | 1/2007 | Petrovich et al. |
| 7,195,157 B2 | 3/2007 | Swartz et al. |
| 7,203,906 B2 | 4/2007 | Abbott et al. |
| 7,225,229 B1 | 5/2007 | Abbott et al. |
| 7,231,439 B1 | 6/2007 | Abbott et al. |
| 7,260,453 B2 | 8/2007 | Poier et al. |
| 7,349,894 B2 | 3/2008 | Barth et al. |
| 7,360,152 B2 | 4/2008 | Capps et al. |
| 7,385,501 B2 | 6/2008 | Miller et al. |
| 7,386,477 B2 | 6/2008 | Fano |
| 7,392,486 B1 | 6/2008 | Gyde et al. |
| 7,395,221 B2 | 7/2008 | Doss et al. |
| 7,444,594 B2 | 10/2008 | Abbott et al. |
| 7,464,153 B1 | 12/2008 | Abbott et al. |
| 7,512,889 B2 | 3/2009 | Newell et al. |
| 7,533,052 B2 | 5/2009 | Tilfors et al. |
| 7,533,082 B2 | 5/2009 | Abbott et al. |
| 7,561,200 B2 | 7/2009 | Garvey, III et al. |
| 7,571,218 B2 | 8/2009 | Tanaka et al. |
| 7,614,001 B2 | 11/2009 | Abbott et al. |
| 7,647,400 B2 | 1/2010 | Abbott et al. |
| 7,689,919 B2 | 3/2010 | Abbott et al. |

| | | |
|---|---|---|
| 7,734,780 B2 | 6/2010 | Abbott et al. |
| 7,739,607 B2 | 6/2010 | Abbott et al. |
| 7,779,015 B2 | 8/2010 | Abbott et al. |
| 7,827,281 B2 | 11/2010 | Abbott et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0147880 A1 | 10/2002 | Wang et al. |
| 2002/0191034 A1 | 12/2002 | Sowizral et al. |
| 2003/0046401 A1 | 3/2003 | Abbott et al. |
| 2003/0154476 A1 | 8/2003 | Abbott, III et al. |
| 2003/0186201 A1 | 10/2003 | Martin |
| 2003/0229900 A1 | 12/2003 | Reisman |
| 2004/0088328 A1 | 5/2004 | Cook et al. |
| 2004/0133600 A1 | 7/2004 | Homer |
| 2004/0186854 A1 | 9/2004 | Choi |
| 2004/0201500 A1 | 10/2004 | Miller et al. |
| 2004/0215663 A1 | 10/2004 | Liu et al. |
| 2004/0267700 A1 | 12/2004 | Dumais et al. |
| 2004/0267812 A1 | 12/2004 | Harris et al. |
| 2005/0027704 A1 | 2/2005 | Hammond et al. |
| 2005/0034078 A1 | 2/2005 | Abbott et al. |
| 2005/0066282 A1 | 3/2005 | Abbott et al. |
| 2005/0086243 A1 | 4/2005 | Abbott et al. |
| 2005/0160113 A1 | 7/2005 | Sipusic et al. |
| 2005/0165843 A1 | 7/2005 | Capps et al. |
| 2005/0193017 A1 | 9/2005 | Kim |
| 2005/0266858 A1 | 12/2005 | Miller et al. |
| 2005/0272442 A1 | 12/2005 | Miller et al. |
| 2006/0004680 A1 | 1/2006 | Robarts et al. |
| 2006/0019676 A1 | 1/2006 | Miller et al. |
| 2006/0136393 A1 | 6/2006 | Abbott et al. |
| 2006/0259494 A1 | 11/2006 | Watson et al. |
| 2007/0022384 A1 | 1/2007 | Abbott et al. |
| 2007/0043459 A1 | 2/2007 | Abbott et al. |
| 2007/0089067 A1 | 4/2007 | Abbott et al. |
| 2007/0130524 A1 | 6/2007 | Abbott et al. |
| 2007/0168502 A1 | 7/2007 | Abbott et al. |
| 2007/0185864 A1 | 8/2007 | Budzik et al. |
| 2007/0266318 A1 | 11/2007 | Abbott et al. |
| 2008/0090591 A1 | 4/2008 | Miller et al. |
| 2008/0091537 A1 | 4/2008 | Miller et al. |
| 2008/0147775 A1 | 6/2008 | Abbott et al. |
| 2008/0161018 A1 | 7/2008 | Miller et al. |
| 2008/0313271 A1 | 12/2008 | Abbott et al. |
| 2009/0013052 A1 | 1/2009 | Robarts et al. |
| 2009/0055752 A1 | 2/2009 | Abbott et al. |
| 2009/0150535 A1 | 6/2009 | Abbott et al. |
| 2009/0228552 A1 | 9/2009 | Abbott et al. |
| 2009/0234878 A1 | 9/2009 | Herz et al. |
| 2009/0282030 A1 | 11/2009 | Abbott et al. |
| 2010/0217862 A1 | 8/2010 | Abbott et al. |
| 2010/0257235 A1 | 10/2010 | Abbott et al. |
| 2010/0262573 A1 | 10/2010 | Abbott et al. |

FOREIGN PATENT DOCUMENTS

| | | | |
|---|---|---|---|
| EP | 0759591 A1 | * | 2/1997 |
| EP | 0801342 A2 | * | 10/1997 |
| EP | 0 823 813 A2 | * | 2/1998 |
| EP | 0846440 A2 | | 6/1998 |
| EP | 0 924 615 A2 | | 6/1999 |
| JP | 05260188 | * | 10/1993 |
| JP | 0 9091112 | | 4/1997 |
| JP | 11306002 | | 11/1999 |
| WO | WO 90/08361 | | 7/1990 |
| WO | WO95/31773 A1 | | 11/1995 |
| WO | WO 97 03434 | | 1/1997 |
| WO | WO97/34388 A2 | | 9/1997 |
| WO | WO9800787 | | 1/1998 |
| WO | WO 98/47084 | | 10/1998 |
| WO | WO 99/17228 | | 4/1999 |
| WO | WO 99/26180 A1 | | 5/1999 |
| WO | WO99/66394 | * | 12/1999 |
| WO | WO 99/67698 A2 | * | 12/1999 |
| WO | WO-0036493 A1 | | 6/2000 |

OTHER PUBLICATIONS

Alps GlidePoint. Http://www.alps.com/p17.html. Last accessed Feb. 10, 1998, p. 1.

Amon, et al. "Integration of Design Education, Research and Practice at Carnegie Mellon University: A Multi-Disciplinary Course in Wearable Computer Design," Proceedings of the Frontiers in Education Conference, Nov. 1-4, 1995, pp. 4a1.14-4a1.22, vol. 2.

Aoki, et al. Realtime Personal Positioning System for a Wearable Computer. Third International Symposium on Wearable Computers, San Francisco, California, Oct. 18-19, 1999.

Bacon, et al. "Using Events to Build Distributed Applications," University of Cambridge, 1996. http://citeseerx.ist.psu.edu/viewdoc/summary?doi=10.1.1.34.4545. Last accessed Dec. 9, 2008, 8 pages.

Bauer, et al. A Collaborative Wearable System with Remote Sensing. University of Oregon, Feb. 1996.

Bier, et al. "Toolglass and Magic Lenses: The See-Through Interface," Proceedings of SIGGRAPH'93, Computer Graphics and Annual Conference Series, ACM, pp. 73-80, Anaheim, California, 1993. http://citeseerx.ist.psu.edu/viewdoc/summary?doi=10.1.1.36.9741. Last accessed Dec. 9, 2008, 8 pages.

Billinghurst, et al. Wearable Devices: New Ways to Manage Information, IEEE Computer Society, Jan. 1999, pp. 57-64.

Bishop. "Hard Ware," Jul. 28, 2000, Puget Sound Business Journal, print edition, pp. 1-4.

Biskup, et al. "Towards Secure Mediation." Oct. 1998.

Bowskill, et al. Wearable Location Mediated Telecommunications: A First Step Towards Contexual Communication. Third International Symposium on Wearable Computers, Oct. 18-19, 1999, San Francisco, California.

"BridgeVIEW and LabVIEW G Programming Reference Manual," Jan. 1998, Nathional Instruments Corporation. http://www.ni.com/pdf/manuals/321296b.pdf. Last accessed Dec. 7, 2008, 667 pages.

Brown, et al. "Using Explicit Requirement and Metrics for Interface Agent User Model Correction." Autonomous Agents '98.

Brown, et al. "Utility Theory-Based User Models for Intelligent Interface Agents," Proceedings of the Twelfth Canadian Conference on Artificial Intelligence (AI'98), Jun. 1998.

Billinghurst, et al., An Evaluation of Wearable Information Spaces, Proceedings of the Virtual Reality Annual International Symposium, 1998, 8 pages.

Billinghurst. Research Directions in Wearable Computing, University of Washington, May 1998, 48 pages.

Budzik, et al. "Watson: Anticipating and Contextualizing Information Needs," May 1, 1999, Proceedings of the 62nd Annual Meeting of the American Society for Information Science, pp. 1-14.

""Context-Awareness in Wearable and Ubiquitous Computing.'" Future Computing Environments, 1997. GVU Technical Report GIT-GVU-97-11. http://www.cc.gatech.edu/fce/pubs/iswc97/wear.html. Last accessed Dec. 8, 2008, 13 pages."

"Context Recognition by User Situation Data Analysis (Context)." http://www.cs.helsinki.fi/group/context/. Last accessed Dec. 9, 2008, 7 pages.

Crabtree, et al. "Wearable Computing and the Remembrance Agent," BT Technology Journal, vol. 16, No. 3, Jul. 1998, pp. 118-124. http://citeseerx.ist.psu.edu/viewdoc/summary?doi=10.1.1.31.8514. Last accessed Dec 9, 2008, 7 pages.

Dey, et al. The Conference Assistant Combining Context Awareness with Wearable Computing. Third International Symposium on Wearable Computers, Oct. 18-19, 1999, San Francisco, California.

D'Orazio, et al. Mobile Robot Position Determination Using Visual Landmarks. IEEE Transactions on Industrial Electronics, vol. 41, issue 6, Dec. 1994, pp. 654-662. Last accessed Dec. 9, 2008, 9 pages.

Doorenbos, et al. "A Scalable Comparison-Shopping Agent for the Worl-Wide-Web," Proceedings of the First International Conference on Autonomous Agents, Marina Del Rey, California, Feb. 5-8, 1997, pp. 39-48. http://www.cs.washington.edu/homes/etzioni/papers/agents97.pdf. Last accessed Dec. 9, 2008, 10 pages.

Horvitz, et al., In Pursuit of Effective Handsfree Decision Support: Coupling Bayesian Inference, Speech Understanding, and User Models, 1995, 8 pages.

Horvitz, et al., Attention-Sensitive Alerting in Computing Systems, Microsoft Research, Aug. 1999.

Fickas, et al. Software Organization for Dynamic and Adaptable Wearable Systems. 1997.

Finger, et al. Rapid Design and Manufacture of Wearable Computers. Communication of the ACM, vol. 39, No. 2, Feb. 1996, pp. 63-68.

Gabbard, et al. A Taxonomy of Usability Characteristics in Virtual Environments. 1997.

Gavrilova. An Approach to Mapping of User Model to Corresponding Interface Parameters. 1997.

Goh, et al. "Context Interchange: New Features and Formalisms for the Intelligent Integration of Information," ACM Transactions on Information Systems, 1997. http://dspace.mit.edu/bitstream/handle/1721.1/2642/SWP-3941-36987967.pdf?sequence=1. Last accessed Dec. 10, 2008, 25 pages.

Golding, et al. Indoor Navigation Using a Diverse Set of Cheap, Wearable Sensors. Third International Symposium on Wearable Computers, Oct. 18-19, 1999, San Francisco, California.

Goodridge. "The Environment Understanding Interface: Detecting and Tracking Human Activity Through Multimedia Sensors." 1995.

Chen, et al., A Survey of Context-Aware Mobile Computing Research, Dartmouth Computer Science Technical Report, 2000, 16 pages.

GyroPoint Technology. http://www.gyration.com/html/gyropoint.html. Last accessed Oct. 2, 1998, pp. 1-3.

Han, et al. "DBMiner: A System for Mining Knowledge in Large Relational Databases," Proceedings 1996 International Conference on Data Mining and Knowledge Discovery, Portland, OR, Aug. 1996. http://www.cs.ualberta.ca/~zaiane/postscript/kdd96.pdf. Last accessed Dec. 9, 2008, 6 pages.*

Haptics. http://www.ai.mit.edu/projects/handarm-haptics/haptics.html. Last accessed Feb. 10, 1998, pp. 1-2.

Harter, et al. "A Distributed Location System for the Active Office." IEEE Network, 1994, pp. 62-70.

Hull, et al. Towards Situated Computing. Hewlette-Packard Laboratories, HPL-97-66 (1997).

"Intelligent User Interface Prompt Level," IBM Technical Disclosure Bulletin, IBM Corp., New York, vol. 35, No. 1A, Jun. 1992, pp. 25-26.

International Search Report dated Sep. 29, 2003 for PCT Application Serial No. 00/20685, 3 Pages.

International Search Report PCT/US01/32543, Oct. 27, 2003, 3 pages.

International Search Report for PCT Application No. PCT/US01/10394, mailed Jun. 13, 2002, 5 pages.

Jakobovits. "Integrating Autonomous Heterogeneous Information Sources." University of Washington, Technical Report, UV-CSE-971205, Jul. 15, 1997, 29 pages.

Kirsch. The Sentic Mouse: A Tool for Measuring Emotional Valence. Http://www.media.mit.edu/affect/AC_research/projects/sentic_mouse.html. Last accessed Feb. 19, 1998, pp. 1-2.

Kortuem, et al. Context Aware, Adaptive, Wearable Computers as Remote Interfaces to Intelligent Environments. University of Oregon, Oct. 1998, 8 pages.

Kortuem. When Cyborgs Meet: Building Communities of Cooperating Wearable Agents. Third International Symposium on Wearable Computers, Oct. 18-19, 1999, San Francisco, California.

"LabVIEW User Manual," Jan. 1998 Edition, National Instruments. http://claymore.engineergvsu.edu/eod/courses/egr450/media/320999b.pdf. Last accessed Dec. 7, 2008, 514 pages.

Lashkari, et al. Collaborative Interface Agents. Proceedings of AAAI'94 Conference, Seattle, Washington, Aug. 1994.

Lehikoinen, et al. MEX: A Distributed Software Architecture for Wearable Computers. Third International Symposium on Wearable Computers, Oct. 18-19, 1999, San Francisco, California.

Leonhardi, et al. Virtual Information Towers—A Metaphor Intuitive, Location-Aware Information Access in a Mobile Environment. Third International Symposium on Wearable Computers, Oct. 18-19, 1999, San Francisco, California.

Leonhardt, et al. "Multi-Sensor Location Tracking." Department of Computing, London, UK, Oct. 1998.

Losee, JR. Minimizing information overload: the ranking of electronic messages, Journal of Information Science 15, Elsevier Science Publishers B.V., 1989, pp. 179-189.

Lunt, et al. Knowledge-Based Intrusion Detection. Proceedings of the Annual Artificial Intelligence Systems in Government Conference, IEEE Comp. Soc. Press, vol. Conf.4, 1989, pp. 102-107.

Maes. Agents That Reduce Work and Information Overload. Communications of the ACM, vol. 37, No. 7, Jul. 1994.

Mann. Smart Clothing: Wearable Multimedia Computing and Personal Imaging to Restore the Technological Balance Between People and Their Environments. ACM Multimedia, Nov. 1996, pp. 163-174.

Metz. MIT: Wearable PCs, Electronic Ink and Smart Rooms. PC Magazaine, pp. 192-193, Jun. 1998.

Mott, et al. "A Formalism for Context Mediation Based on Feature Logic." Feb. 1998. http://citeseerx.ist.psu.edu/viewdoc/summary?doi=10.1.1.52.4473. Last accessed Dec. 10, 2008, 11 pages.

Ni. "Attribute Name Evaluation and Its Implementation," School of Computing and Mathematics, Deakin University, Geelong, Victoria, May 16, 1994. http://www.deakin.edu.au/scitech/sit/dsapp/archive/techreport/TR-C94-10.pdf. Last accessed Dec. 9, 2008, 32 pages.

OA Dated Oct. 30, 2008 for U.S. Appl. No. 11/490,540, 37 pages.
OA Dated Sep. 15, 2008 for U.S. Appl. No. 11/033,974, 17 pages.
OA Dated Aug. 14, 2008 for U.S. Appl. No. 10/981,941, 14 pages.
OA Dated Dec. 3, 2008 for U.S. Appl. No. 09/981,320, 40 pages.
OA Dated Aug. 1, 2008 for U.S. Appl. No. 11/179,822, 17 pages.
OA Dated Sep. 17, 2008 for U.S. Appl. No. 09/894,642, 28 pages.
OA Dated Jul. 29, 2008 for U.S. Appl. No. 10/984,511, 28 pages.
OA Dated Dec. 4, 2008 for U.S. Appl. No. 11/567,902, 21 pages.
OA Dated Nov. 28, 2008 for U.S. Appl. No. 11/761,210, 11 pages.

Oakes. The Truman Show Realized? http://www.wired.com/news/news/technology/story/15745.html. Last accessed Feb. 10, 1998, pp. 1-4.

Ockerman, et al. "Wearable Computer for Performance Support: Initial Feasibility Study," International Symposium in Wearable Computers, Oct. 1997, pp. 10-17.

Papakonstantinou, et al. "MedMaker: A Mediation System Based on Declarative Specifications." 1995. http://citeseerx.ist.psu.edu/viewdoc/summary?doi=10.1.1.35.735. Last accessed Nov. 25, 2008, 10 pages.

Picard, et al. Affective Wearables. Personal Technologies vol. 1, 231-240, MIT Media Laboratory (1997).

Rekimoto, et al. The World Through the Computer: Computer Augmented Interaction with Real World Environments, ACM, Nov. 1995, pp. 29-36.

Research Areas in Affective Computing. Http://www.media.mit.edu/affect/. Last accessed Feb. 10, 1998, p. 1.

Research on Affective Pattern Recognition and Modeling. Http://www.media.mit.edu/affect/AC_research/recognizing.html. Last accessed Feb. 10, 1998, pp. 1-4.

Research on Sensing Human Affect. Http://www.media.mit.edulaffect/AC_research/sensing.html. Last accessed Feb. 10, 1998, pp. 1-5.

Rhodes, Remembrance Agent: A continuously running automated information retrieval system, The Proceedings of the First International Conference on the Practical Application of Intelligent Agents and Multi Agent Technology, 1996, pp. 487-495.

Rhodes, The Wearable Remembrance Agent: A System for Augmented Memory, Personal Technologies Journal Special Issue on Wearable Computing, 1997, 12 pages.

Rhodes. The Wearable Rememberance Agent: A System for Augmented Memory. Proceedings of the First International Symposium on Wearable Computers (ISWC'97), Cambridge, MA, Oct. 13-14, 1997.

Rhodes. WIMP Interface Considered Fatal. http://rhodes.www.media.mit.edu/people/rhodes/Papers/no-wimp.html. Last accessed Feb. 10, 1998, pp. 1-3.
Rogers, et al. Outbreak Agent: Intelligent Wearable Technology for Hazardous Environments. IEEE International Conference, Orlando, Florida, Oct. 12-15, 1997, pp. 3198-3203. http://citeseerx.ist.psu.edu/viewdoc/summary?doi=10.1.1.46.8827. Last accessed Nov. 25, 2008, 6 pages.
Rosis, et al. "Adaptive Interaction with Knowledge-Based System," ACM 1994.
Sato, et al. Autonomous Behaviour Control of Virtual Actors Based on the AIR Model. Proceedings Computer Animation, Jun. 5, 1997.
Schilt. A System Architecture for Context-Aware Mobile Computing, Columbia University, 1995, 153 pages.
Schilit, et al., The ParcTab Mobile Computing System, IEEE WWOS-IV, 1993, 4 pages.
Schilit, et al., Context-Aware Computing Applications, In Proceedings of the Workshop on Mobile Computing Systems and Applications, Dec. 1994. pp. 85-90.
Schilit, et al., Customizing Mobile Applications, Proceedings USENIX Symposium on Mobile and Location Independent Computing, Aug. 1993, 9 pages.
Schilit, et al., Disseminating Active Map Information to Mobile Hosts, IEEE Network, 1994, pp. 22-32, vol. 8—No. 5.
Schmidt, et al. "There's More to Context Than Location." Proceedings of the International Workshop on Interactive Applications of Mobile Computing (IMC98), Germany, Nov. 1998, 10 pages. http://citeseer.comp.nus.edu.sg/cache/papers/cs/16114/http:zSzzSzwww.teco.eduzSz~albrechtzSzpublicationzSzdraft_docszSzcontext-is-more-than-location.pdf/there-is-more-to.pdf.
Schneider, et al. Modeling Wearable Negotiation in an Opportunistic Task Oriented Domain. Third International Symposium on Wearable Computers, Oct. 18-19, 1999, San Francisco, California.
Smailagic, et al. Matching Interface Design with User Task: Modalities of Interaction with CMU Wearable Computers. IEEE Personal Communications, Feb. 1996, pp. 14-25.
Smailagic, et al. MoCCA: A Mobile Communication and Computing Architecture. Third International Symposium on Wearable Computers, Oct. 18-19, 1999, San Francisco, California.
Smart Rooms. http://vismod.www.media.mit.edu/vismod/demos/smartroom/. Last accessed Feb. 10, 1998, pp. 1-3.
SmartDesk Home Page. http://vismod.www.media.mit.edu/vismod/demos/smartdesk/. Last accessed Feb. 10, 1998, pp. 1-4.
Spreitzer, et al. "Providing Location Information in a Ubiquitous Computing Environment," Xerox Palo Alto Research Center , ACM, 1993, pp. 270-283. http://www.comp.lancs.ac.uk/computing/staff/kc/Lecturing/MSc/wk10/p270-spreitzer.pdf. Last accessed Dec. 9, 2008, 14 pages.
Spreitzer, et al. Architectural Considerations for Scalable, Secure, Mobile Computing with Location Information, In the 14th International Conference on Distributed Computing Systems, Jun. 1994, pp. 29-38.
Spreitzer et al. Scalable, Secure, Mobile Computing with Location Information, Communications of the ACM, Jul. 1993, 1 page, vol. 36—No. 7.
Starner, et al. Visual Contexual Awareness in Wearable Computing. Media Lab, MIT, Oct. 1998.
Starner. Wearable Computing and Contextual Awareness, Massachusetts Institute of Technology, Jun. 1999, 248 pages.
T. Joachims, Text categorization with support vector machines: learning with many relevant features, Machine Learning, European Conference on Machine Learning, Apr. 21, 1998, pp. 137-142.
Tan, et al. Tactual Displays for Wearable Computing, IEEE, MIT Media Laboratory, pp. 84-88, 1997.
The MIT Wearable Computing Web Page. http://wearable.www.media.mit.edu/projects/wearables/. Last accessed Feb. 10, 1998, pp. 1-3.
Theimer, et al. Operating System Issues for PDAs, In Fourth Workshop on Workstation Operating Systems, 1993, 7 pages.

Wachowicz, et al. "Combining Location and Data Management in an Environment for Total Mobility," University of Cambridge, England, 1996. http://citeseerx.ist.psu.edu/viewdoc/summary?doi=10.1.1.37.4550. Last accessed Dec. 9, 2008, 12 pages.
Want, Active Badges and Personal Interactive Computing Objects, IEEE Transactions on Consumer Electronics, 1992, 11 pages, vol. 38—No. 1.
Want, et al., The Active Badge Location System, ACM Transactions on Information Systems, Jan. 1992, pp. 91-102, vol. 10—No. 1.
Wardell. "Stardock.net Releases WindowBlinds." Stardock.net, Inc. Oct. 4, 1999, http://stardock.net/media/pr_wb10.html. Last accessed Dec. 9, 2008, 2 pages.
Wearable Computer Systems for Affective Computing. http://www.media.mit.edu/affect/AC_research/wearables.html. Last accessed Feb. 10, 1998, pp. 1-5.
Weiser. The Computer for the 21st Century, Scientific American, Sep. 1991, 8 pages.
Weiser. Some Computer Science Issues in Ubiquitous Computing, Communications of the ACM, Jul. 1993, pp. 75-84, vol. 36—No. 7.
Workshop on Wearable Computing Systems, Aug. 19-21, 1996.
Yang. SmartSight: A Tourist Assistant System. Third International Symposium on Wearable Computers, Oct. 18-19, 1999, San Francisco, California.
Zenel, et al. "A General Purpose Proxy Filtering Mechanism Applied to the Mobile Environment," Proceedings of the 3rd annual ACM/IEEE international conference on Mobile computing and networking, MOBICOM'97, Budapest, Hungary, pp. 248-259. http://portal.acm.org/citation.cfm?id=262153. Last accessed Dec. 9, 2008, 12 pages.
Bates et al., Middleware Support for Mobile Multimedia Applications, ICL System Journal, Nov. 1997, 20 pages.
Cugola et al., Exploiting an Event-Based Infrastructure to Develop Complex Distributed Systems, 20th International Conference on Software Engineering (ICSE'98) Apr. 1998, p. 261-70, 10 pages.
Dechamboux et al., Using a Distributed Shared Memory for Implementing Efficient Information Mediators, Proceedings of the International Conference and Exhibition on High-Performance Computing and Networking, Apr. 1996, 5 pages.
Dey et al., CyberDesk: A Framework for Providing Self-Integrating Context-Aware Services, Knowledge-Based Systems, 11:3-13, 1998, 10 pages.
European Office Action dated Feb. 13, 2009 for EP Application No. 01964695.9, 4 pages.
Goharian et al., Enterprise Text Processing: A Sparse Matrix Approach, 2001, IEEE, pp. 71-75.
International Search Report, Application No. PCT/US01/10599, Nov. 28, 2002.
International Search Report, PCT/US01/10538, Aug. 14, 2002, 2 pages.
OA dated Jan. 2, 2009 for U.S. Appl. No. 11/559,854, 23 pages.
Ockerbloom, Mediating Among Diverse Data Formats: Thesis Summary, PhD Thesis, Technical Report CMU-CS-98-102, Department of Computer Sciences, Carnegie Mellon University, Pittsburgh, PA, Jan. 14, 1998, 15 pages.
Pascoe, Adding Generic Contextual Capabilities to Wearable Computers, Proceedings of the 2nd International Symposium on Wearable Computers (ISWC '98), Pittsburgh, PA, Oct. 19-20, 1998, 8 pages.
Sawhney, Contextual awareness, messaging and communication in nomadic audio environments, Massachusetts Institute of Technology, Jun. 1998 pp. 80-105, 25 pages.
Starovic, An Event Based Object Model for Distributed Programming, Technical Report TCD-CS-95-28, Dept. of Computer Science, Trinity College Dublin, Ireland, 1995, retrieved from http://citeseer.ist.psu.edu/starovic95event.html, 15 pages.
Salber et al., The Design and Use of a Generic Context Server. Technical Report GIT-GVU-98-32. GVU Center, College of Computing, Georgia Institute of Technology. 1998. Available at ftp://ftp.cc.gatech.edu/pub/gvu/tr/1998/98-32.pdf. Last accessed Mar. 12, 2010.

* cited by examiner context server table — 400

| context server name | version | installation date | filename | request handler |
|---|---|---|---|---|
| gps | 1.00.315 | 2/10/2000 | gps.exe | (reference) |
| ips | 1.00.315 | 2/21/2000 | ips.exe | (reference) |
| location_region_analysis | 1.00.315 | 2/10/2000 | l_r_a.exe | (reference) |

411, 412, 413, 414, 415
401, 402, 403

*Fig. 4* attribute instance table — 500

| attribute name | context server name | value | uncertainty | timestamp | units |
|---|---|---|---|---|---|
| user.location | gps | 47°38.73' N, 122°18.43' W | 0°.09' | 13:11:04.023 2/22/2000 | degrees/minutes |
| user.location | ips | 47°38.745' N, 122°18.424' W | 0°.021' | 13:11:01.118 2/22/2000 | degrees/minutes |
| user.elevation | ips | 22 | .5 | 13:11:01.118 2/22/2000 | meters |
| user.in_region | location_region_analysis | none | none | none | none |

| context client name | message handler |
|---|---|
| location_map | (reference) |
| distance_from_home | (reference) |
| region_analysis | (reference) | context client table 600

| context client name | attribute name | context server name |
|---|---|---|
| region_analysis | user.location | |
| distance_from_home | user.location | |
| location_map | user.elevation | ips |
| location_map | user.in_region | region_analysis | attribute or instance registration table 700

711 / 712 / 713 / 701 / 702 / 703 / 704

*Fig. 7* attribute instance table 900

| attribute name | context server name | value | uncertainty | timestamp | units | number of context clients consuming |
|---|---|---|---|---|---|---|
| user.location | gps | 47°38.73' N, 122°18.43' W | 0°.09' | 13:11:04.023 2/22/2000 | degrees/minutes | 2 |
| user.location | ips | 47°38.745' N, 122°18.424' W | 0°.021' | 13:11:01.118 2/22/2000 | degrees/minutes | 2 |
| user.elevation | ips | 22.25 | .5 | 13:11:06.565 2/22/2000 | meters | 1 |
| user.in_region | location_analysis | none | none | none | none | 1 |

901, 902, 903, 904 — 911, 912, 913, 914, 915, 916, 919

*Fig. 9* condition table 1000

| condition name | context client name | first logical parameter | second logical parameter | comparison value | logical operator |
|---|---|---|---|---|---|
| in_region_true | region_analysis | user.in_region | none | TRUE | = |

| condition monitor name | context client name | condition name | behavior | frequency | condition last evaluated | trigger handler reference | stopped |
|---|---|---|---|---|---|---|---|
| region_boundary_crossed | region_analysis | in_region_true | any state change | 30 | 13:11:29.101 2/22/2000 | (reference) | no | condition monitor table — 1100

Fig. 12

| condition monitor name | context client name | condition name | behavior | frequency | condition last evaluated | trigger handler reference | stopped |
|---|---|---|---|---|---|---|---|
| region_boundary_crossed | region_analysis | in_region_true | any state change | 30 | 13:11:59.101 2/22/2000 | (reference) | yes | condition monitor table — 1100

Fig. 14

| attribute name | context server name | property name | property value |
|---|---|---|---|
| user location | ips | security_token | 5A637AR |

1401, 1402, 1403, 1404 attribute instance property table — 1400

INTERFACE FOR EXCHANGING CONTEXT DATA

CROSS-REFERENCE TO RELATED APPLICATIONS

This application is a continuation of U.S. patent application Ser. No. 11/075,529, filed Mar. 8, 2005, entitled "INTERFACE FOR EXCHANGING CONTEXT DATA," now U.S. Pat. No. 7,478,331, which is a continuation of U.S. patent application Ser. No. 09/692,507, filed Oct. 19, 2000, entitled "INTERFACE FOR EXCHANGING CONTEXT DATA," now U.S. Pat. No. 6,920,616, which is a continuation-in-part of U.S. patent application Ser. No. 09/541,328, filed Apr. 2, 2000, entitled "INTERFACE FOR EXCHANGING CONTEXT DATA," now abandoned, and of U.S. patent application Ser. No. 09/541,326, filed Apr. 2, 2000, entitled "LOGGING AND ANALYZING COMPUTER USER'S CONTEXT DATA," now abandoned, and of U.S. patent application Ser. No. 09/216,193, filed Dec. 18, 1998, entitled "METHOD AND SYSTEM FOR CONTROLLING PRESENTATION OF INFORMATION TO A USER BASED ON THE USER'S CONDITION," now U.S. Pat. No. 6,466,232, all of which are hereby incorporated by reference in their entirety.

TECHNICAL FIELD

The present invention is directed to the field of context modeling and, more particularly, to the field of data exchange for context modeling.

BACKGROUND

Wearable computers are devices that commonly serve as electronic companions and intelligent assistants to their users. A wearable computer is typically strapped to its user's body or carried by its user in a holster, and can contain a variety of both input and output devices. A wearable computer can output information to its user using, for example, display eyeglasses, audio speakers, or a tactile output device. A wearable computer can receive instructions and other input from its user via input devices such as a keyboard, various pointing devices, or an audio microphone. A wearable computer can receive information about its surroundings using sensors, such as barometric pressure and temperature sensors, global positioning system devices, or a heart rate monitor for determining the heart rate of its user and can receive additional information via communication devices, such as various types of network connections. A wearable computer can exchange information with other devices using communication schemes such as infrared communication, radio communication, or cellular modems.

Many applications for wearable computers utilize data received by the wearable computer from sensors. For example, a position mapping application for a wearable computer may utilize data received from a global positioning system device to plot its user's physical location and determine whether that position is within a special region. In this example, the global positioning system device produces data that is consumed by the position mapping-application.

In conventional wearable computer systems, the position mapping application would be designed to interact directly with the global positioning system device to obtain the needed data. For example, the application may be required to instruct the device to obtain position information, retrieve the information obtained by the device, convert it to conventional latitude and longitude representation, and determine whether the represented location is within the special region.

Such direct interaction between applications and sensors to obtain and process data has significant disadvantages. First, developing an application to interact directly with a particular sensor can introduce into the application dependencies on that sensor. Accordingly, the application may need to be subsequently modified to interact successfully with alternatives to that sensor provided by other manufacturers, or even to interact successfully with future versions of the sensor from the same manufacturer.

Second, direct interaction between the application and the sensor can give rise to conflicts between multiple applications that consume the same data. For example, if the position mapping application was executing on the same wearable computer as a second application for determining the user's distance from home that also used the global positioning system device, the two applications' interactions with the device could interfere with one another.

Third, direct interaction between the application and the sensor can give rise to conflicts between multiple sensors that produce the same data. For example, if the position mapping application was executing on a wearable computer that had access to both the global positioning system device and an indoor positioning system, the application might well have trouble determining which device to use to determine the user's current position, and/or have trouble reconciling data produced by both devices.

Fourth, performing the derivation of abstract information from data observable by sensors in each application that requires the derived abstract information necessitates redundant functionality in each such application, and precludes the development of multiple competing algorithms to derive the same abstract information; rather than having to themselves process data from the sensor to derive more abstract information from data observable by sensors, it would be advantageous for applications to be able to rely on a separate programmatic entity to derive such abstract information. For example, it would be more convenient for the position mapping application to be able rely on a separate programmatic entity to determine whether the user is in a special region based upon the user's location. It would further be advantageous for such applications to share a single separate programmatic entity, rather each implementing the same derivation functionality.

Accordingly, a facility for exchanging information between sensors and applications in a wearable computer system would have significant utility.

BRIEF DESCRIPTION OF THE DRAWINGS

FIG. 4 is a data structure diagram showing a context server table that maintains a portion of the state of the characterization module.

FIG. 5 is a data structure diagram showing an attribute instance table that maintains a portion of the state of the characterization module.

FIG. 6 is a data structure diagram showing a context client table that maintains a portion of the state of the characterization module.

FIG. 7 is a data structure diagram showing an attribute or instance registration table that maintains a portion of the state of the characterization module.

FIG. 9 is a data structure diagram showing updated contents of the attribute instance table.

FIG. 10 is a data structure diagram showing a condition table that contains a portion of the state of the characterization module.

FIG. 11 is a data structure diagram showing a condition monitor table that maintains a portion of the state of the characterization module.

FIG. 12 is a data structure diagram showing updated contents of the condition monitor table.

FIG. 14 is a data structure diagram showing an attribute instance property table that maintains a portion of the state of the characterization module.

DETAILED DESCRIPTION

Figure 1:
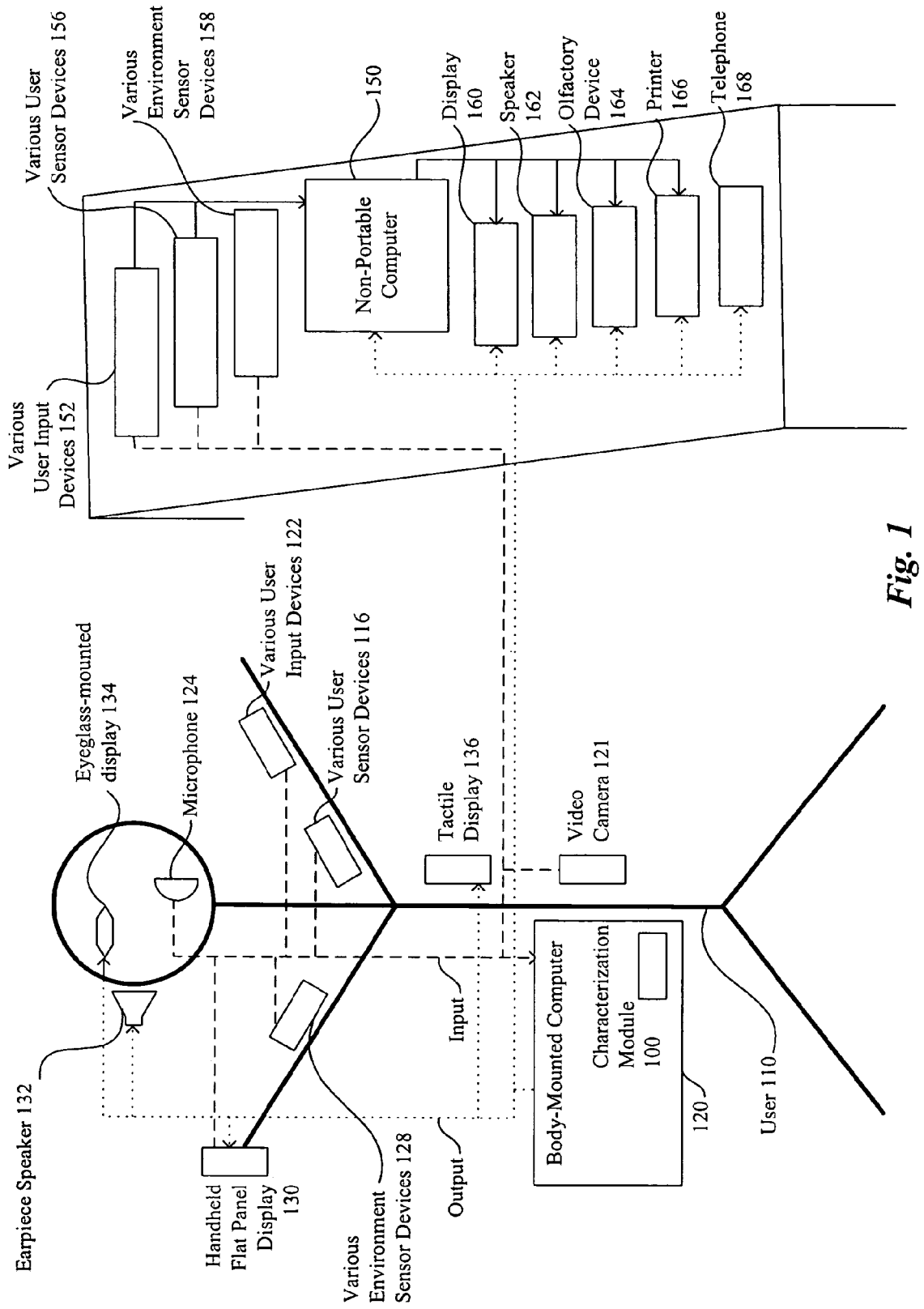
FIG. 1 illustrates an embodiment of the characterization module which executes on a general-purpose body-mounted wearable computer 120 worn by a user 110.

A software facility for exchanging information between sources of context data and consumers of context data ("the facility") is provided. In a preferred embodiment, a characterization module operating in a wearable computer system receives context information, in the form of individual attributes each modeling an aspect of the wearable computer system, its user, or the surrounding environment, from one or more context servers, and provides it to one or more context clients. The facility reduces dependencies of context client applications on specific sensors and other input devices, reduces conflicts between context client applications that consume the same context data, resolves conflicts between multiple sensors or other input devices that produce the same data, isolates the derivation of derived attributes from context client applications, and therefore obviates the redundant effort of implementing the derivation of derived attributes in each context server, and facilitates the development and use of competing algorithms to derive derived attributes.

Attributes represent measures of specific context elements such as ambient temperature, location and current user task. Each attribute preferably has the following properties: a name, a value, an uncertainty level, units, and a time stamp. Attributes provided through the characterization module by a context server may either be "measured," in that they are directly received from an input device, or "derived," in that they are the result of performing processing on values directly obtained from input devices other attributes. Indeed, a derived attribute may be produced by performing additional processing on other derived attributes. Context servers, in addition to providing attributes through the characterization module, may also provide other functions. For example, an application, such as an electronic mail application, could serve as a context server by providing attributes through the characterization module. In addition to the source of attributes described above, such an "expanded" context server may provide attributes relating to the other functions of the expanded context server. For example, an electronic mail application context server could provide an attribute indicating other new messages are waiting. Indeed, the same program module may operate both as a context client and a context server.

Two or more different context servers may preferably supply to the characterization module their own values for a single attribute. For example, a first context server can supply a value for a user.location attribute based on data received from a global positioning system device, while a second context server can supply a value for the user.location attribute based on data received from an indoor positioning device. These separate values for the same attribute are referred to as separate "instances" of the attribute. The characterization module preferably provides a variety of different approaches, called "mediators," for determining, when an attribute requested by a context client has more than one instance, what attribute value to provide in response to the attribute request.

When the characterization module obtains an attribute value from a context server, it preferably caches it for responding to future requests for the attribute from context clients. Such attribute requests may specify a specific instance of the attribute—that is, a specific context server from which the attribute is to be obtained—or may specify that the attribute is to be obtained by applying a particular mediator to whatever instances of the attribute are available, or may utilize a default mediator to mediate between available instances of the attribute. When the characterization module receives an attribute request from a context client, it identifies the attribute instances available to satisfy the request, and, for each, determines whether the value for the attribute instance cached by the characterization module was obtained sufficiently recently from the corresponding context server. If not, the characterization module requests an updated value for the attribute instance from the corresponding context server before performing any necessary mediation and returning a value to the context client.

Context servers and context clients preferably interact with the characterization module by calling functions provided by the characterization module. These functions are said to collectively comprise an "application programming interface" (or "API") to the characterization module.

A context client that seeks to request a particular attribute or attribute instance may call a LaunchContextServer function to launch a particular context server that is not executing. Each executing context server preferably registers with the characterization module by calling a RegisterContextServer function, identifying itself. The context server goes on to make an instance of an attribute available to context clients via the characterization module by following a CreateAttributeInstance function. A particular context server may preferably provide a number of different attributes by calling the CreateAttributeInstance function multiple times. Before seeking to consume an attribute, a context client calls a RegisterContextClient function, identifying itself. In order to consume an attribute, a context client calls a RegisterToConsumeAttributeOrInstance function, identifying itself and an attribute that it seeks to consume. To help determine which attributes to consume, a context client may call a EnumerateAttributes function to obtain a list of the attributes available from the characterization module. In order to actually retrieve an attribute value, a context client calls a GetAttribute function, identifying the attribute and any attribute processing that should be applied, such as a specific type of mediation between different instances of the attribute obtained from different context servers. For attributes that have multiple instances in the characterization module, a context client may call a GetAllAttributeInstances function to obtain a value of the attribute for each attribute instance. To force a particular context server to reevaluate all of its attribute instances, a context client may call a CompleteContextServerEvaluation function. Also, to retrieve attributes reflecting aspects of the configuration of the characterization module, a context client or other program may call a GetCharacterizationModuleAttribute function. A context client that consumes a particular attribute may create a condition in the characterization module that tests that attribute by calling a CreateCondition function. Once a context client has created a condition, it can evaluate the condition by calling an EvaluateCondition function, identifying the condition. Once a context client has created a condition, it may go on to call a CreateConditionMonitor function to create a condition monitor that monitors the condition and notifies the context server when the condition is satisfied. To suspend operation of a created condition monitor, a context server may call a StopConditionMonitor function, and to resume its operation, may call a StartConditionMonitor function. The context server may remove a condition monitor that it created by calling a RemoveConditionMonitor function, and, correspondingly, may remove a condition that it created by calling a RemoveCondition function. A context client may unregister to consume a particular attribute by calling an UnregisterToConsumeAttributeOrInstance function. A context client may unregister itself with the characterization module by calling an UnregisterContextClient function. A context server may—though need not—remove attribute instances that it has registered by calling a RemoveAttributeInstance function. Before it does, however, it may—though need not—first call a CheckAttributeInstanceDependencies function to determine whether any context clients currently depend upon that attribute instance. Once it has removed its attribute instances, a context server may unregister with the characterization module by calling an UnregisterContextServer function. These API functions are discussed in greater detail below in conjunction with an example.

FIG. 1 illustrates an embodiment of the characterization module which executes on a general-purpose body-mounted wearable computer 120 worn by a user 110. Many wearable computers are designed to act as constant companions and intelligent assistants to a user, and are often strapped to a user's body or mounted in a holster. The computer system may also be incorporated in the user's clothing, be implanted in the user, follow the user, or otherwise remain in the user's presence. In one preferred embodiment the user is human, but in additional preferred embodiments, the user may be an animal, a robot, a car, a bus, or another entity whose context data is to be processed. Indeed, the computer system may have no identifiable user, but rather operate as an independent probe, processing context data in an arbitrary location. The wearable computer 120 has a variety of user-worn user input devices including a microphone 124, a hand-held flat panel display 130 with character recognition capabilities, and various other user input devices 122. Similarly, the computer has a variety of user-worn output devices that include the hand-held flat panel display, an earpiece speaker 132, an eyeglass-mounted display 134, and a tactile display 136. In addition to the various user-worn user input devices, the computer can also receive information from various user sensor input devices 116 and from environment sensor input devices 128, including video camera 121. The characterization module can receive and process the various input information received by the computer, such as from context servers that process the input information and generate attribute values, and can present information to the user on the various output devices accessible to the computer.

In the current environment, computer 120 is accessible to a computer 150 (e.g., by being in line-of-sight wireless proximity or by being reachable via a long-distance communication device such as a cellular phone) which also has a variety of input and output devices. In the illustrated embodiment the computer 150 is non-portable, although the body-mounted computer of the user can similarly communicate with a variety of other types of computers, including body-mounted computers of other users. The devices from which the non-portable computer can directly receive information include various user input devices 152 and various user sensor input devices 156. The non-portable computer can output information directly to a display 160, a speaker 162, an olfactory device 164, and a printer 166. In the illustrated embodiment, the body-mounted computer can communicate with the non-portable computer via a wireless transmission medium. In this manner, the characterization module can receive information from the user input devices 152 and the user sensor devices 156 after the information has been transmitted to the non-portable computer and then to the body-mounted computer. Alternately, the body-mounted computer may be able to directly communicate with the user input devices 152 and the user sensor devices 156, as well as with other various remote environment sensor input devices 158, without the intervention of the non-portable computer 150. Similarly, the body-mounted computer may be able to supply output information to the display 160, the speaker 162, the olfactory device 164, and the printer 166, either directly or via the non-portable computer, and directly to the telephone 168. As the user moves out of range of the remote input and output devices, the characterization module will be updated to reflect that the remote devices are not currently available.

The various input devices allow the characterization module or an application such as a context server (not shown) executing on the computer system 120 to monitor the user and the environment and to model their current condition. Such a model can be used by various applications, such as context clients, for various purposes. A model of the current conditions can include a variety of condition variables that represent information about the user, the computer, and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current conditions can additionally include information added explicitly from other sources (e.g., application programs), as well as user-specified or system-learned defaults and preference information.

Those skilled in the art will appreciate that computer systems 120 and 150, as well as their various input and output devices, are merely illustrative and are not intended to limit the scope of the present invention. The computer systems may contain additional components or may lack some illustrated components. For example, it is possible that the characterization module can be implemented on the non-portable computer, with the body-mounted computer replaced by a thin context client such as a transmitter/receiver for relaying information between the body-mounted input and output devices and the non-portable computer. Alternately, the user may not wear any devices or computers.

In addition, the body-mounted computer may be connected to one or more networks of other devices through wired or wireless communication means (e.g. wireless RF, a cellular phone or modem, infrared, physical cable, a docking station, etc.), either with or without support from other computers such as the computer 150. For example, the body-mounted computer of a user can make use of output devices in a smart room, such as a television and stereo when the user is at home, if the body-mounted computer can transmit information to those devices via a wireless medium or if a cabled or docking mechanism is available. Alternately, kiosks or other information devices can be installed at various locations (e.g., in airports or at tourist spots) to transmit relevant information to body-mounted computers within the range of the information device.

Those skilled in the art will also appreciate that specialized versions of the body-mounted computer and characterization module can be created for a variety of purposes.

Figure 2:
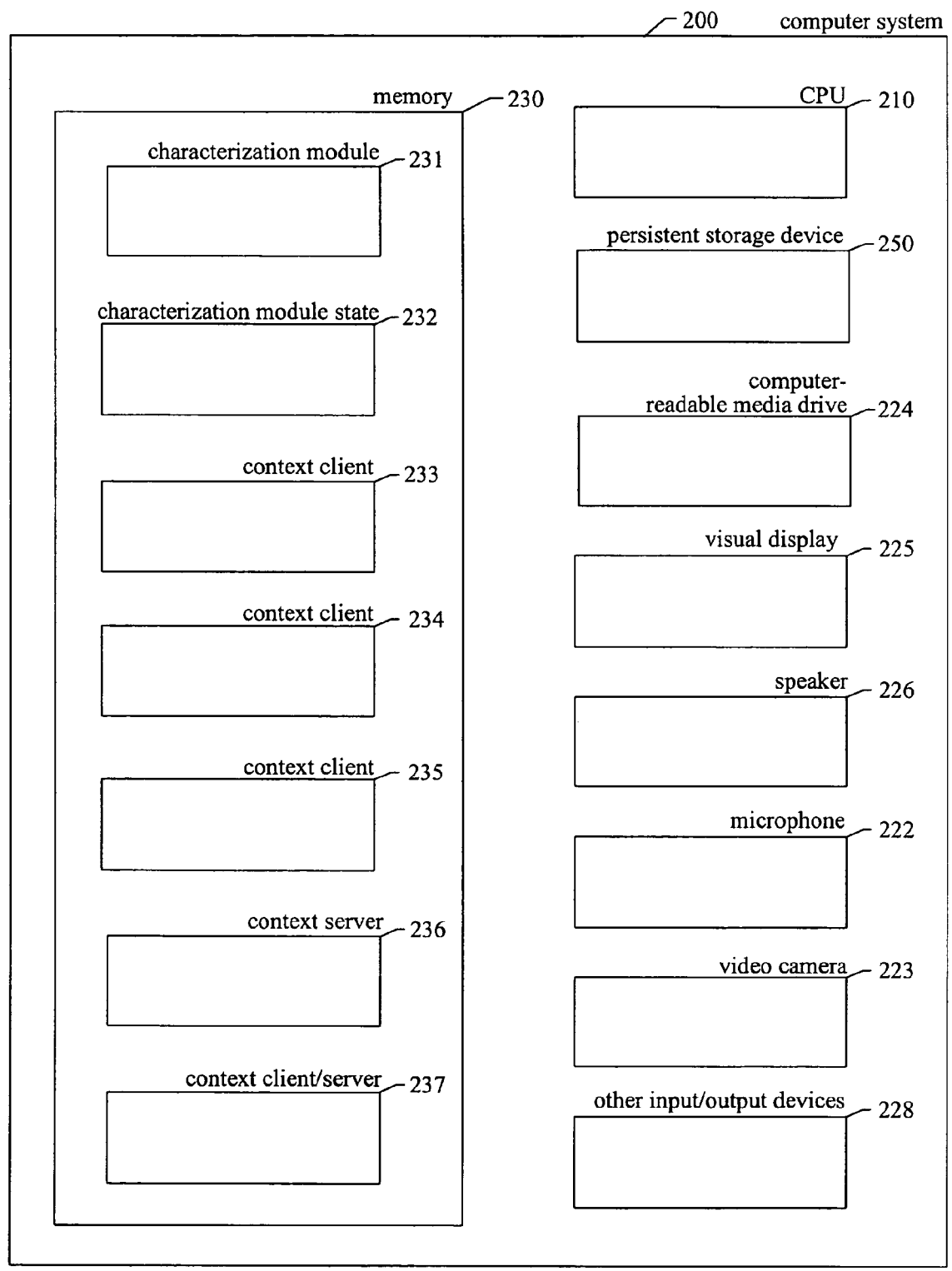
FIG. 2 illustrates an exemplary computer system 200 on which an embodiment of the characterization module is executing.

FIG. 2 illustrates an exemplary computer system 200 on which an embodiment of the characterization module is executing. The computer includes a memory 230, a CPU 210, a persistent storage device 250 such as a hard drive, and input/output devices including a microphone 222, a video camera 223, a computer-readable media drive 224, such as a CD-ROM, drive, a visual display 225, a speaker 226, and other devices 228. The memory preferably includes the characterization module 231, as well as information reflecting the current state of the characterization module (characterization module state) 232. The memory further contains software modules 233, 234, and 237 that consume attributes and are therefore context clients, and software modules 235, 236, and 237 which provide attributes and are therefore context servers. While items 231-237 are preferably stored in memory while being used, those skilled in the art will appreciate that these items, or portions of them, can be transferred between memory and the persistent storage device for purposes of memory management and data integrity.

The facility preferably utilizes a plain-language, hierarchical, taxonometric attribute nomenclature to name attributes. The attribute names within the nomenclature are preferably specific so that there is no ambiguity as to what they represent. The facility preferably supports the extension of the nomenclature by adding new attribute names that conform to the hierarchical taxonomy of the nomenclature. The nomenclature preferably has attribute names relating to the user, such as user.position, user.speed, and user.direction providing information about the user's position, speed, and direction, respectively. The nomenclature preferably contains attribute names for various user moods, such as user.mood.happiness, user.mood.anger, and user.mood.confusion. The nomenclature preferably includes attribute names for user activities, such as user.activity.driving, user.activity.eating, and user.activity.sleeping. The nomenclature preferably includes attribute names for user physiology values, such as user.physiology.pulse, user.physiology.body_temperature, and user.physiology.blood_pressure. The nomenclature preferably includes attribute names for similar attributes of people other than the user, such as person.John_Smith.mood.happiness. The nomenclature preferably includes attribute names for aspects of the computer system or "platform." For example, the nomenclature preferably includes attribute names for aspects of the platform's user interface, such as platform.user_interface.oral_input_device_availability and platform.user_interface.visual_output_device_availability. The nomenclature preferably includes attribute names for attributes relating to the central processing unit, or "CPU," of the platform, such as platform.cpu_load and platform.clock_speed. The nomenclature preferably also provides attribute names for aspects of the local environment, such as environment.local.time, environment.local.temperature, and environment.local.ambient_noise_level. The nomenclature preferably also includes attribute names for remote environments, such as environment.place.chicago.time and environment.place.san_diego.temperature. The nomenclature preferably further provides attribute names relating to specific applications. For example, the nomenclature preferably provides attribute names for aspects of an electronic mail application, such as application.mail.available, application.mail.new_messages_waiting, and application.mail.messages_waiting_to_be_sent. In this manner, the attribute nomenclature used by the facility provides effective names for attributes relating to the user, the computer system, and the environment. Additional detail on the attribute nomenclature utilized by the facility is provided in U.S. patent application Ser. No. 09/724,893, entitled "Supplying User Context Data With Dynamically Specified Suppliers and Consumers," which is hereby incorporated by reference in its entirety.

Figure 3:
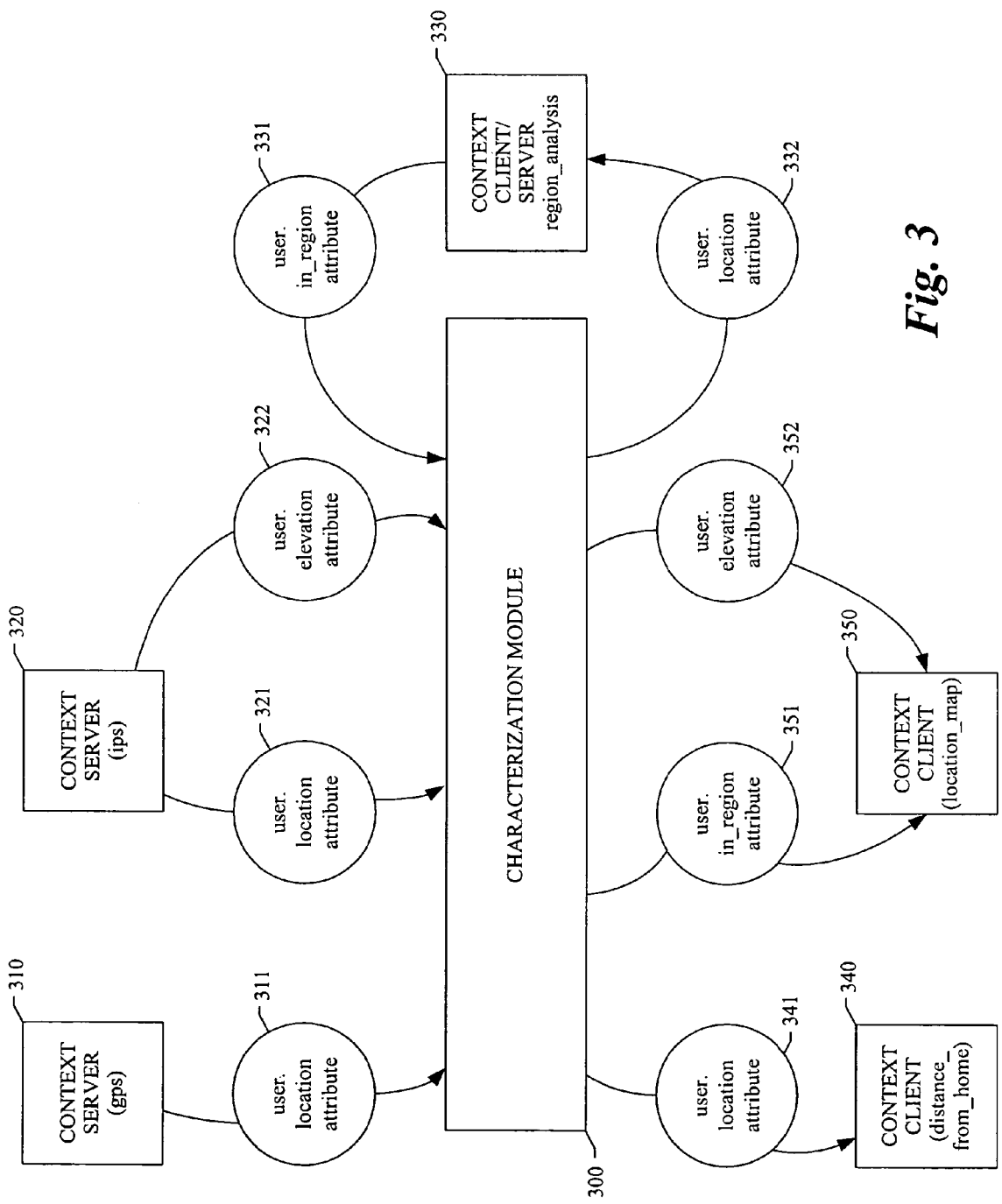
FIG. 3 is a data flow diagram showing a sample exchange of attributes performed by the characterization module.

FIG. 3 is a data flow diagram showing a sample exchange of attributes performed by the characterization module. The diagram shows characterization module 300, as well as five other software modules, 310, 320, 330, 340, and 350. Software modules 310, 320, and 330 are said to be context servers, in that they provide attributes to the characterization module. For example, context server 330 provides an user.in_region attribute 331. It can be seen that context servers may provide more than one attribute. For example, context server 320 provides a user.location attribute 321, and an user.elevation attribute 322. It can further be seen that a single attribute may be provided by more than one context server. For example, context server 310 provides user.location attribute 311, while context server 320 provides user.location attribute 321. The characterization module preferably provides functionality for mediating between these two separate instances of a user.location attribute when the user.location attribute is requested by a context client.

Software modules 330, 340, and 350 are said to be context clients because they consume attributes. For example, context client 340 consumes user.location attribute 341. It can be seen that certain software modules may act both as a context server and as a context client. For example, software module 330 is both a context server and a context client, as it provides the user.in_region attribute 331, as well as consuming a user.location attribute 332. It can also be seen that a context client consumes more than one attribute. For example, context client 350 consumes both user.in_region attribute 351 and user.elevation attribute 352. To determine which attributes are currently available, any of the context clients may request that the characterization module enumerate the available attributes. In response to such a request, the characterization module would enumerate the user.location attribute, the user.location attribute, and the user.in_region attribute. Additional preferred embodiments permit context clients to otherwise limit attribute enumeration requests. For example, a context client may request enumeration of all user interface attributes by specifying the wildcard-expanded attribute name platform.user_interface.*.

The characterization module preferably implements the API functions described in detail below in order to obtain attribute values from context servers and provide them to context clients. While these functions are preferably exposed via Microsoft Component Object Module ("COM") interfaces, those skilled in the art will appreciate that they could be made available to context servers and context clients through a variety of other mechanisms, including a number of different function-calling and message-passing invocation schemes.

LaunchContextServer

Any application can launch a context server that is not already running by calling this function, passing the following parameter:

Context Server Identifier—A filename, COM object, or other identification method that unambiguously identifies the context server and exposes a mechanism for launching it.

This function returns an error if the requested context server is not found, and returns an error if the requested context server is already running.

Each context server has an associated startup behavior, which specifies whether or not the context server is automatically launched when the characterization module launches. Context servers installation application or the characterization module's control panel applet may be used to change the startup behavior.

RegisterContextServer

When a context server launches, it calls this function to notify the characterization module of its intent to provide attribute instances, passing the following parameters:

Context Server Name—A name that conforms to attribute naming specifications and uniquely identifies the context server.

Version—A floating point number that corresponds to the version of the context server.

Installation Date—The date and time that the context server was installed.

Filename—The context server's main filename expressed as an absolute pathname.

Request Handler—A reference to a context server interface that accepts messages from the characterization module to the context server. This information is not available to external modules.

If the registration request includes a context server name that is already in use, the characterization module returns an error and does not register the context server.

FIG. 4 is a data structure diagram showing a context server table that maintains a portion of the state of the characterization module. When the RegisterContextServer function is called, the characterization module preferably adds a row to the context server table corresponding to the registered context server. The context server table 400 contains rows 401-403, each corresponding to a registered context server. Each row contains a context server name field 411 containing the name of the context server, a version field 412 identifying the version of the context server, an installation date 413 identifying the date on which the context server was installed on the computer system, a filename 414 identifying a primary file in the file system representing the context server, and a request handler field 415 containing a reference to a request handler function on the context server that may be called by the characterization module to request evaluation of one or all of the attributes provided by the context server. The characterization module preferably adds a row to the context server table when the LaunchContextServer function is called. For example, when the location_region_analysis context server calls the LaunchContextServer function, the characterization module preferably adds row 403 to the context server table. The contents of row 403 indicate that version 1.00.315 of the location_region_analysis context server, installed on Feb. 10, 2000 and having file name l_r_a.exe is registered with the request handler referenced in the request handler field 415 of row 403.

CreateAttributeInstance

Context servers may create an attribute instance at any time by calling this function, passing the following parameters:

Context Server Name—A name that is unique to the requesting context server. This name should be the same for all attributes that the context server creates. In some embodiments, this parameter is implicit in each call to this function, and need not be explicitly passed.

Attribute Name—The name of the attribute.

Data Type—The type of data in which the attribute's value and uncertainty are expressed.

Format Version—The number of the format version in which the value is expressed.

Request Handler—A reference to the context server function that processes attribute requests from the characterization module. The characterization module may also send messages to the context server via this function. A single request handler may be used for multiple attributes. In an alternative embodiment, the Request Handler parameter may be specified only during context server registration, rather than during attribute instance creation, or during either activity.

Startup Behavior—Specifies whether or not the context server should be loaded automatically at startup. This parameter is optional. If included, it supercedes any previous setting for the requesting context server. If the startup behavior is never specified, the characterization module is not responsible for launching the context server. In an alternative embodiment, the Startup Behavior parameter may be specified only during context server registration, rather than during attribute instance creation, or during either activity.

This function returns an error if the name matches that of an attribute that the context server has already created. If another instance of the attribute already exists and has the same format version, this function returns an error if the data type does not match that of the existing attribute.

FIG. 5 is a data structure diagram showing an attribute instance table that maintains a portion of the state of the characterization module. The attribute instance table contains a row for each attribute instance created by a context server. When a context server calls the CreateAttributeInstance function, the characterization module preferably adds a row to the attribute instance table. The attribute instance table 500 contains rows 501-504, each corresponding to a different attribute instance. Each of these rows contains the following fields: an attribute name field 511 containing the name of the attribute, a context server name field 512 identifying the context server that created the attribute instance, a value field 513 containing the value of the attribute last provided by the context server, and uncertainty field 514 identifying the level of uncertainty of the value, a timestamp 515 indicating the time at which the value is effective, and a units field 516 identifying the units for the value and the uncertainty. For example, row 501 indicates that an instance of the user.location attribute from the gps context server has the effective time of 13:11:04.023 on Feb. 22, 2000. Its value is 47° 36.73' N, 122° 18.43' W degrees and minutes, with an uncertainty of 0° 0.09'. It should be noted, as shown, the user's location, expressed in terms of latitude and longitude, is maintained in a single attribute. In alternative embodiments, such a location could be maintained in a larger number of attributes. For example, rather than being maintained in a single user.location attribute, such a location could be distributed across four separate attributes: user.location.latitude.degrees, user.location.latitude.minutes, user.location.longitude.degrees, and user.location.longitude.minutes. The characterization module preferably adds row 504 to the attribute instance table when the location_region_analysis context server calls the CreateAttributeInstance function for the user.in_region attribute.

RegisterContextClient

Each context client registers with the characterization module, passing the following parameters:

Name—A name for the context clients used for all attribute registrations for a particular context client. If the context client also acts as a context server, it preferably uses the identical name for context server registration, though may use a different name.

Message Handler—A reference to a context client function that processes messages from the characterization module, such as notifications that attributes are destroyed or the characterization module is shutting down.

The first time a context client registers, it provides a non-null message handler. Subsequent calls by that context client may provide a new message handler that replaces the previous one.

FIG. 6 is a data structure diagram showing a context client table that maintains a portion of the state of the characterization module. The context client table 600 contains rows 601-603, each corresponding to a registered context client. Each row contains a context client name field 611 identifying the name of the registered context client, as well as a message handler field 612 containing the reference to a message handler provided by the context client for processing messages from the characterization module. The characterization module preferably adds a row to the context client table for each context client that calls the RegisterContextClient function. For example, the characterization module preferably adds row 603 when the region_analysis context client calls the RegisterContextClient function. Added row 603 contains a reference to the message handler for the region_analysis context client.

EnumerateAttributes

Context clients call this function to request a listing of attributes that meet certain criteria, passing the following parameter:

Source—The name of the context server providing the attributes that the context client is requesting. If supplied, the characterization module returns all attributes from the corresponding context server. If not supplied, the characterization module returns all attributes.

This function returns the following information to the calling context client:

Attributes—A list of the attributes that meet the request's criteria. If no attributes meet the criteria, the list is empty. If an attribute meets the criteria but its source-prohibits the context client from seeing the attribute, it is not included in the list.

If a source is specified and not found, the characterization module returns an error to the context client. In additional preferred embodiments, other parameters may be included to limit the set of attributes that are enumerated.

RegisterToConsumeAttributeOrInstance

A context server calls this function for each attribute or attribute instance that it will be requesting, passing the following parameters:

ContextClientName—The context client's name

AttributeName—The name of the attribute that the context client is requesting to consume.

Source—The context server whose instance of this attribute the context client is registering to consume. If blank, the request constitutes a request to consume a mediated attribute, rather than an attribute instance.

Context clients may register for attributes at any time. Requests for nonexistent attributes produce an error. Requests are not persistent, so the context client must register again to consume the attribute or attribute instance when it becomes available.

FIG. 7 is a data structure diagram showing an attribute or instance registration table that maintains a portion of the state of the characterization module. The attribute or instance registration table contains rows 701-704, each corresponding to a different registration that a context client has made for an attribute or an attribute instance. Each row contains a context client name field 711 indicating the name of the context client registering to consume the attribute or attribute instance, an attribute name field containing the attribute name for the attribute or attribute instance, and a context server name field 713 that, for attribute instance registrations contains the name of the context server providing the instance, which is blank for attribute registrations. For example, row 704 indicates that the location map context client has registered to consume the instance of the user.in_region provided by the region_analysis context server.

GetAttribute

Context clients call this function to request an attribute value, passing the following parameters:

Name—A name identifying the attribute.

Source—The name of the context server from which to obtain the requested attribute. If no Source is specified, the characterization module assumes the attribute may come from any source, and it uses an attribute mediator to select one.

Attribute mediator—The name of the selection method that it would like used to select the attribute from multiple instances. If no attribute mediator is provided, the characterization module's default method is used. If a source and an attribute mediator are provided, the mediator is ignored. The characterization module preferably provides attribute mediators such as the following: a mediator that selects the first attribute instance that was created, a mediator that selects the last attribute instance that was created, a mediator that selects the first attribute instance to be provided in response to a request for evaluation, a mediator that selects the attribute instance having the lowest level of uncertainty, a mediator that selects the attribute instance having the newest data value, a mediator that calculates the average of the available attribute instances, a mediator that selects the most common of the attribute instances, a mediator that allows the user to select among the attribute instances, and mediators that select an attribute instance whose confidence level, as adjusted for attenuation over the age of the data at a variety of rates, is the highest. Those skilled in the art will appreciate that additional types of attribute mediators may also be employed by the characterization module and requested by context clients.

Age—An expression of the maximum age of the attribute information. If the request is made for a specific attribute instance by specifying a source, then only that instance is checked, and if too old, it is freshened. If no source is specified and multiple instances are present, the characterization module applies the attribute mediator to those that satisfy the age requirement. If no instances satisfy the age requirement, all instances are freshened prior to the application of the attribute mediator.

Timeout—A period of time within which the characterization module should return the attribute. If the attribute is not evaluated within this time, the characterization module sends an error message to the context client. The resulting return values are those of the most recent valid evaluation, or null if no valid data are available. A timeout value of zero instructs the characterization module to wait indefinitely for a response.

Supplemental Properties—The context server may also return to the characterization module names and values for supplemental properties associated with the attribute instance. For example, some supplemental properties may include security information used to determine which context clients may receive attribute instance, as well as additional information further characterizing the attribute instance.

If the request timeout is exceeded and the characterization module subsequently responds to the request, the returned value replaces the current most recent value cached in the characterization module. If an error is returned after the timeout period, it is ignored. The characterization module preferably does not send additional information to the context client that initiated the request.

This function returns the following to the calling context client:

Name—A string that identifies the attribute.

Value—The quantity of the attribute.

Uncertainty—A quantity that represents the range of likely values around Value that the attribute is likely to have. The contents of the Uncertainty property depend upon what type of information is stored in Value. The Uncertainty property characterizes the extent to which the attribute value may differ from the real quantity being measured, based upon factors including—but not limited to—the precision of measuring apparatus used to measure the quantity, the conversion of continuous quantities to discrete values in the measurement process, random fluctuations, temporal variations, systematic errors, and measurement latency.

Timestamp—A timestamp that represents the effective age of the data. In particular, the timestamp specifies the time at which the attribute value would have been valid had it been measured directly at that moment, irrespective of whether the attribute value was actually measured at that time.

Units—The units of measure in which the Value and Uncertainty have been expressed.

Source—A reference to the object that created and owns the instance of the attribute, usually a context server. If the attribute comes from a condition or a condition monitor, the source is the source of the condition or condition monitor. Some attributes that refer to the characterization module or that are monitored by the characterization module have the characterization module as the source.

Attribute mediator—The name of the selection method that was used to select the attribute from multiple instances. If no attribute mediator was used (either because only one instance of the attribute was available or because a source was specified), the attribute mediator is left blank.

Format Version—The version of the attribute's format specification.

Flags—Not in use at this time.

Supplemental Properties—Where the context server has provided supplemental properties, they are returned to the context client, except where the supplemental properties are designated to not be provided to context clients.

Reference to Context Server's Callback Function—Optional: The characterization module may return to the context client a direct reference to the context server that provided the returned attribute instance, enabling the context client to call the context server directly in the future to get a new value for the attribute.

This function returns an error to the calling context client if the requested attribute, requested source, or the requested mediator does not exist or if its value is, unavailable. Attributes whose values are unavailable are ignored if other instances of the attribute satisfy the request made by the context client.

Figure 8:
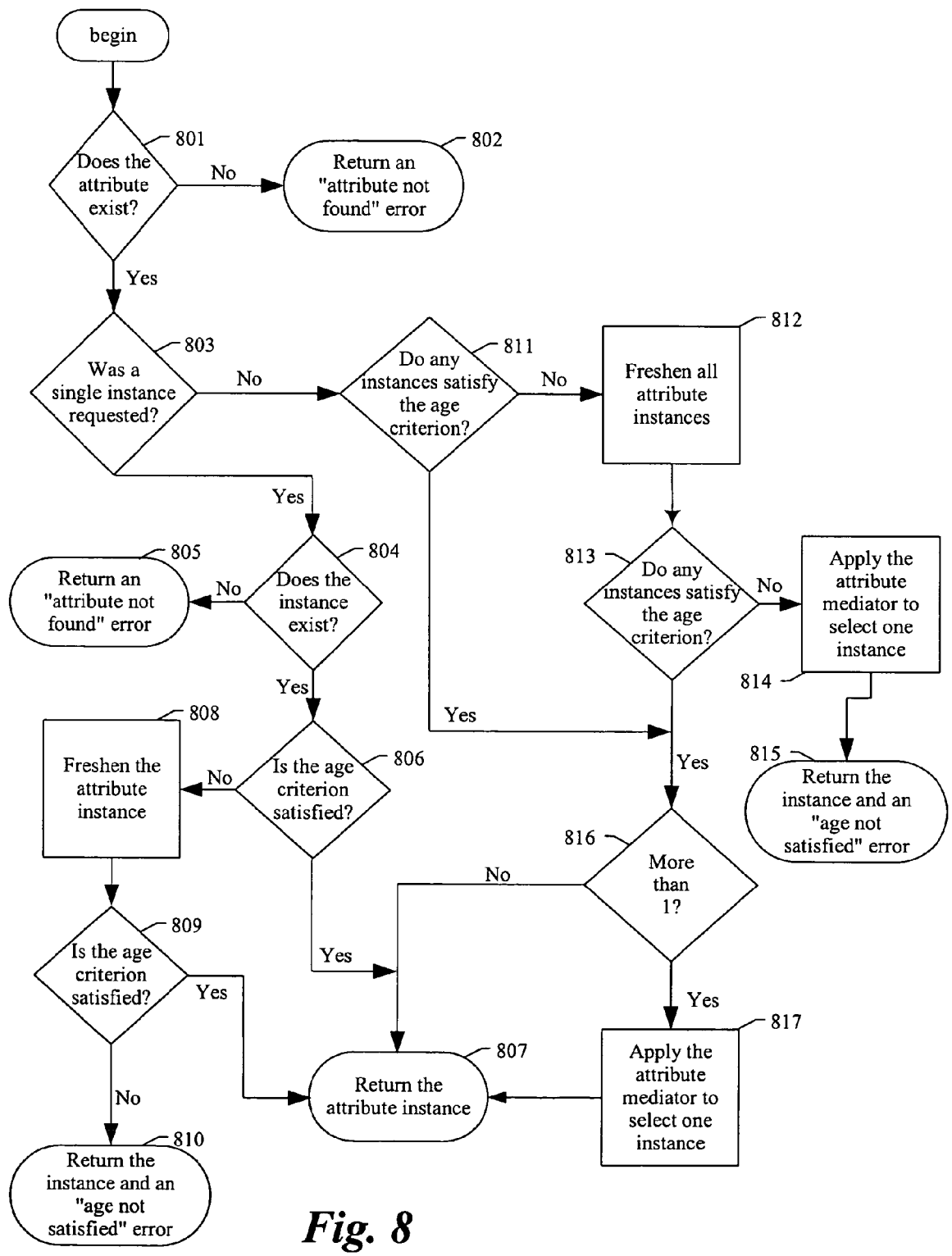
FIG. 8 is a low diagram showing the steps preferably performed by the characterization module when the GetAttribute function is called.

FIG. 8 is a flow diagram showing the steps preferably performed by the characterization module when the GetAttribute function is called. In step 801, if the requested attribute exists, then the facility continues in step 803, else the facility continues in step 802 to return an "attribute not found" error. In step 803, if a single instance of the attribute was requested, then the facility continues in step 804, else the facility continues in step 811. In step 804, if the requested instance exists, then the facility continues in step 806, else the facility continues in step 805 to return an "attribute instance not found" error. In step 806, if the age criterion specified for the attribute request is satisfied, then the facility continues in step 807 to return the requested attribute instance, else the facility continues in step 808 to "freshen" the attribute instance by calling the appropriate context servers' request handler to request evaluation of the attribute instance. In step 809, if the age criterion is satisfied by the freshened attribute instance, then the facility continues in step 807 to return the freshened attribute instance, else the facility continues in step 810 to return the freshened attribute instance with an "age not satisfied" error.

In step 811, where a single attribute instance was not requested, if any registered instances of the attribute satisfy the age criterion, then the facility continues in step 816, else the facility continues in step 812. In step 812, the facility freshens all registered instances of the requested attribute. In step 813, if any of the attributes freshened in step 812 satisfy the age criterion, then the facility continues in step 816, else the facility continues in step 814. In step 814, the facility applies the requested attribute mediator to select one instance, or otherwise derive a value from the registered instances. In step 815, the facility returns the instance with an "age not satisfied" error.

In step 816, where one or more instances satisfy the age criterion, if more than one instance satisfies the age criterion, then the facility continues in step 817, else the facility continues in step 807 to return the attribute instance that satisfies the age criterion. In step 817, the facility applies the requested attribute mediator to select one instance from among the instances that satisfy the age criterion, or to otherwise derive a value from the instances that satisfy the age criterion. After step 817, the facility continues in step 807 to return the value produced by the mediator.

The characterization module requests attributes from a context server by calling the request handler registered by the context server, passing the following parameters:

Attribute Name—The name of the attribute being requested.

Timeout—The timeout period that the context server is expected to fulfill.

The context server is expected to satisfy the request within the timeout period with the following information:

Value—The quantity of the attribute.

Uncertainty—A quantity that represents the range of likely values around Value that the attribute is likely to have. The contents of the uncertainty property depend upon what type of information is stored in Value. The uncertainty is required and is expressed in the same units and format as the value.

Timestamp—A timestamp that represents the effective age of the data. This age reflects the point in time when the value is most accurate. It is the responsibility of the context server to determine how the timestamp relates to those of attributes that it uses. The timestamp is required, and is preferably determined with the computing platform's clock to facilitate easy comparison in context clients.

Units—The units of measure in which the Value and Uncertainty have been expressed as a predefined set of allowable units, from among a predetermined set of allowable units. The units parameter is required.

Format Version—The version of the format specification used to express the attribute's value and uncertainty.

If the context server is able to determine that the request cannot be answered, it returns an error to the characterization module. For instance, the context server may be asking a physical sensor for data, and the physical sensor is not responding.

If the context server cannot provide an attribute because it received an error message from an attribute that it queries, it returns the error message that it received.

When a call to this function necessitates the reevaluation of an attribute instance, the characterization module preferably substitutes that value in the corresponding row of the attribute instance table, thereby caching the attribute instance for possible future use. FIG. 9 is a data structure diagram showing updated contents of the attribute instance table. It can be seen in attribute instance table 900 that, upon reevaluation by the ips context server of its instance of the user.elevation attribute, the characterization module replaced the former contents of the value, uncertainty and timestamp field of row 903, shown in FIG. 7, with the values resulting from the reevaluation shown in FIG. 9.

GetAllAttributeInstances

Context clients call this function to request all instances of a particular attribute. This function uses the same parameters as GetAttribute, except that the attribute source is omitted. This function returns the same information for each attribute instance.

In one embodiment, this function is separate from the GetAttribute function. In an alternative embodiment, this function is omitted and the GetAttribute function is called without specifying the attribute source parameter in order to request all instances of a particular attribute.

CompleteContextServerEvaluation

To force a context server to calculate all of its output attributes at the same time, a context client calls this function, passing the following parameters:

Context Server Name—An identifier of the context server of interest.

Timeout—A period of time within which the characterization module should successfully force a complete evaluation. If the context server's attributes are not completely evaluated within this time, the characterization module sends an error message to the context client.

When this function is called, it in turn calls the request handler for the identified context server, requesting complete evaluation of the context server's attributes by specifying a special value for the AttributeName parameter. In response, the context server evaluates all of its attributes and provides them to the characterization module delaying other requests until it has finished. If the context server uses other attributes to evaluate its own, it requests fresh versions of these attributes, but it is neither required to or prohibited from requesting complete evaluation.

This function returns the following to the calling context client:

Attributes—The attributes that were simultaneously evaluated including all of their constituent information as specified in the GetAttribute section. Note that the attribute source need not be repeated for each attribute.

This function returns an error if the request either timed-out or there was no context server with the specified name.

The characterization module possesses several attributes of its own that may be of interest to context clients and context servers. Read-only parameters are surfaced as attributes identical to those created by other context servers, except that the owner of these attributes is the characterization module itself. Several adjustable items require two-way information flow and thus have their own interfaces. In an alternative embodiment, adjustable items are exposed as attributes.

GetChatacterizationModuleAttribute

Context clients call this function to request attributes containing information about the characterization module, passing a parameter identifying the requested attribute. The available items are attributes for which the characterization module is the creator and owner; otherwise they behave identically to all other attributes. characterization module attributes are visible to all context clients. The following read-only characterization module attributes may be requested:

Version—Contains a description of the characterization module version.

Path—A string containing the absolute path within which the characterization module has been installed, in the proper format for the computing platform.

Time—The local time as maintained by the computer's clock.

Date—The date as maintained by the computer's clock.

Default Timeout—Some requests require polling context servers for attribute information. The characterization module sends an error to the requesting context client if the context server does not respond within a specified time interval. If the context client has not specified this interval with its request, the characterization module's default value is used. A timeout value of zero instructs the characterization module to wait indefinitely for a response. No parameters are necessary to read the default timeout setting, and such requests result in an immediate response from the characterization module with that information. The default timeout may preferably be changed by the user via a characterization module control application/control panel applet. In additional embodiments, the default attribute mediator may be changed in another manner, such as under the control of a program other than the characterization module.

Default Attribute Mediator—Context clients can read the characterization module's default attribute mediator. No parameters are necessary to read the default attribute mediator, and the characterization module returns the attribute mediator's name. The default attribute mediator may preferably be changed by the user via a characterization module control application/control panel applet. In additional embodiments, the default attribute mediator may be changed in another manner, such as under the control of a program other than the characterization module.

In one embodiment, this function is separate from the GetAttribute function. In an alternative embodiment, this function is omitted and the GetAttribute function is called in order to request a characterization module attribute.

CreateCondition

Context clients call this function to create a condition to check a relationship between an attribute and a value or between two attributes, passing the following:

Name—A name for the condition. This name must be unique among all conditions created by the same context client.

$1^{st}$ Logical Parameter—An attribute name identifying an attribute, an attribute name and source identifying an attribute instance, or a condition name identifying a condition.

$2^{nd}$ Logical Parameter—An attribute name identifying an attribute, an attribute name and source identifying an attribute instance, or a condition name identifying a condition.

Value—A value for attribute comparison. If an attribute is provided as the $2^{nd}$ logical parameter, the value is ignored.

Logical Operator—One of a predefined set of logical operators. The allowed operators depend upon whether the characterization module is asked to compare attributes or conditions as shown in Table 1 below.

TABLE 1

List of Logical Operators for Conditions

| Attributes | Conditions |
|---|---|
| > | AND |
| < | OR |
| = | XOR |
| >= | NOR |
| <= | NOT |
| <> | |

Conditions may compare an attribute with another attribute, and attribute with a value, or a condition with another condition. These combinations are listed below in Table 2.

TABLE 2

Parameter Usage for Conditions

| $1^{st}$ Parameter | $2^{nd}$ Parameter | Action |
|---|---|---|
| Attribute Name | <none> | Compares attribute to value |
| Attribute Name | Attribute Name | Compares attributes to each other |
| Condition Name | Condition Name | Compares conditions to each other |

This function returns an error if the requested name is already in use by another condition that was created by the calling context client. An error is returned if the referred to attributes or conditions do not exist. An error is returned if an attribute is requested along with a condition or vice-versa.

FIG. 10 is a data structure diagram showing a condition table that contains a portion of the state of the characterization module. Condition table 1000 has a row for each condition created by a context client. Row 1001 contains a condition name field 1011 containing the name of the condition, a context client name 1012, identifying the context client that created the condition, a first logical parameter field 1013 and a second logical parameter field 1014 identifying, attributes or other conditions that are compared by the condition, a comparison value 1015 that specifies a value to which the first logical parameter is compared if no second logical parameter is listed, and a logical operator 1016, identifying the logical operator to be applied in the comparison. The characterization module preferably adds row 1001 to condition table 1000 when the region_analysis context client creates the in_region_ true condition to indicate whether the user is presently within a special region. Added row 1001 indicates that the in_region_true condition was created by the region_analysis context client, and has first logical parameter user.in_region, no second logical parameter, comparison value TRUE, and logical operator "=".

EvaluateCondition

A context client calls this function to query conditions that it has created passing the following parameters:

Name—The name of the condition.

Timeout—A period of time within which the characterization module should have successfully evaluated the condition.

This function returns the following to the calling context client:

Value—A Boolean expression resulting from the evaluation of the condition.

This function returns an error if the condition requests a non-existent attribute, the requested condition does not exist, or the timeout is exceeded.

When this function is called for a particular condition, the facility preferably uses the information in the corresponding row of the condition table to evaluate the condition. For example, when this function is called for the in_region_true condition, the facility preferably uses information row 1001 of condition table 1000 shown in FIG. 10 to evaluate this condition.

CreateConditionMonitor

A context client calls this function to create a condition monitor to monitor for a change in a condition and be notified when it occurs, passing the following parameters:

Name—The name of the condition monitor.

Condition—The name of the condition that triggers the condition monitor.

Behavior—Specifies when the condition monitor triggers. The condition monitor may be triggered when the condition becomes true, becomes false, or when it changes state in either direction.

Frequency—The time between subsequent checks for triggering of the condition monitor. This value must be non-zero.

Trigger Handler—A reference to a context client procedure that the characterization module notifies when the condition monitor is triggered.

An error is returned if the name is already in use by another condition monitor from the calling context client.

FIG. 11 is a data structure diagram showing a condition monitor table that maintains a portion of the state of the characterization module. Condition monitor table 1100 has a row 1101 corresponding to a condition and containing each of the following fields: a condition monitor name field 1111 containing the name of the condition monitor; a context client name field 1112 containing the name of the context client that created the condition monitor; a condition name field 1113 that contains the name of the condition monitored by the condition monitor; a behavior field 1114 that indicates whether the condition monitor is triggered when the condition becomes true, when it becomes false, or when it changes value in either direction; a frequency field 1115 showing the frequency with which the condition monitor evaluates the condition; a condition last evaluated field 1116 showing the time at which the condition monitor last evaluated the condition; a trigger handler reference 1117 that identifies a trigger handler function of the context client that is to be called when the condition monitor is triggered; and a stopped field 1118 that indicates whether the context client has suspended operation of the condition monitor. The condition monitor preferably adds row 1101 to the condition monitor table when the region_analysis context client creates the region_boundary_ crossed condition to notify the region_analysis context client when the value of the in_region_true condition changes, indicating that the user has entered or left the special region. Row 1101 indicates that the region_boundary_crossed condition monitor was created by the region_analysis, context client, is based upon the in_region_true condition, monitors for both TRUE and FALSE behavior, is evaluated every 30 seconds, was last evaluated at 13:11:29.101 on Feb. 22, 2000, has the trigger handler referenced in field 1117 of row 1101, and is not presently stopped.

StopConditionMonitor

A context client calls this function to temporarily suspend the operation of a condition monitor, passing the following parameter:

Name—The name of the condition monitor.

This function returns an error to the calling context client if the name does not correspond to an existing condition monitor created by that context client.

FIG. 12 is a data structure diagram showing updated contents of the condition monitor table. It can be seen from stopped field 1218 of row 1201 in condition monitor table 1200 that the region_analysis context client has stopped, or suspended the operation of, the region_boundary_crossed condition monitor, perhaps in response to the observation that the user is now asleep and his or her location will remain constant.

StartConditionMonitor

A context client calls this function to resume operation of a stopped condition monitor, passing the following parameter:

Name—The name of the condition monitor.

This function returns an error to the calling context client if the name does not correspond to an existing condition monitor created by that context client.

When the StartConditionMonitor function is called, the facility preferably changes the contents of the stopped field 1118 from "yes" as shown in FIG. 11 to "no" as shown in FIG. 12, so that the characterization module resumes operation of the condition monitor.

RemoveConditionMonitor

Context clients call this function to remove a condition monitor that it has created, passing the following parameter:

Name—The name of the condition monitor.

This function returns an error to the calling context client if the name does not correspond to an existing condition monitor created by the calling context client. If the condition monitor is active when this function is called, this function automatically stops the condition monitor prior to removing it.

When this function is called, the characterization module preferably deletes the row of the condition monitor table corresponding to the condition monitor. For example, if this function is called for the region_boundary_crossed condition monitor, the characterization module preferably deletes row 1201 of condition monitor table 1200 shown in FIG. 12.

RemoveCondition

A context client calls this function to remove a condition that it owns, passing the following parameter:

Name—the name of the condition to be removed.

An error is returned if the name does not correspond to an existing condition created by the calling context client. The characterization module returns an error if other conditions or condition monitors rely upon the condition, and the condition is not removed.

When this function is called for a particular condition, the characterization module preferably deletes the corresponding row from the condition table. For example, when this function is called for in_region_true condition the facility preferably deletes row 1001 from condition table 1000 shown in FIG. 10.

In the foregoing, a preferred embodiment is described in which conditions and condition monitors are created separately. In an alternative preferred embodiment, conditions and condition monitors are created together as a single entity, with a single API function call.

UnregisterToConsumeAttributeOrInstance

A context server calls this function to unregister to consume an attribute or attribute instance that it is registered to consume, passing the following parameters:

Context Server Name—The name of the context server.

Attribute Name—The name of the attribute for which the context client is unregistering.

Source—For requests to unregister to consume an attribute instance, contains the name of the context server providing the attribute instance. For requests to unregister to consume an attribute, is blank.

This function removes the row corresponding to the specified attribute or instance registration from the attribute or instance registration table.

This function returns an error if the attribute or instance registration table does not contain a row corresponding to the specified registration.

UnregisterContextClient

Context clients may unregister themselves at any time. Before calling this function, context clients are expected to first remove all conditions, condition monitors, and attributes that pertain to the registration they are ending, parsing the following:

Context Client Name—Name of the context client to unregister.

Unregistration of a context client results in the removal of all remaining conditions, condition monitors, and attribute consumption registrations that it owns.

The characterization module may ask the context client to unregister. Such requests require no parameters. The context client responds to such a request by calling this function within a reasonable period of time. If such acknowledgement is not made, the characterization module preferably removes the context client registration and all of its conditions and condition monitors automatically.

When this function is called for a particular context client, the characterization module preferably deletes the corresponding row from the context client table. For example, when this function is called for the region_analysis context client, the facility preferably deletes row 603 from context client table 600 shown in FIG. 6.

CheckAttributeInstanceDependencies

To determine whether there are context clients using one of its attribute instances, a context server calls this function, passing the following parameter:

Attribute—The name of the attribute.

Context Server Name—The name of the calling context server.

This function returns the following to the calling context server:

Number—The number of context clients that are registered for the attribute instance named in the request. This includes all context clients that have registered for the context server's specific instance as well as those that have registered for the attribute for which there is only one instance. This does not include registrations for an attribute for which there, are additional context server's able to satisfy the context clients' requests.

This function returns an error if the requested attribute instance does not exist.

When this function is called, it preferably first refers to the attribute or instance registration table to count how many context clients have registered specifically, for the calling context server's instance of the attribute. The function further identifies any registrations for this attribute from any context server, i.e., rows of the attribute or instance registration table containing the attribute name of this attribute instance and no context server name. For these identified rows, the function consults the attribute instance table to determine whether instances of this attribute other than the one provided by the calling context server are present in the table. If not, the function also counts the number of context clients registered to consume the attribute from any context server.

RemoveAttributeInstance

Context servers call this function to remove the instances of attributes that they have created, passing the following parameter:

Name—The name of the attribute to remove.

This function returns an error if the requested name does not correspond to an attribute that the context server may remove.

This function notifies context clients registered for this attribute instance that it is no longer available. Context clients that register for any one of multiple instances of an attribute are only notified when the last instance of the attribute is removed. If conditions or condition monitors rely upon the attributes that are being removed, their owners are notified, and the conditions and rules are removed.

When this function is called for a particular attribute instance, the characterization module preferably removes the corresponding row from the attribute instance table. For example, when the location_region_analysis context, server calls this function for its instance of the user.in_region attribute, the characterization module preferably deletes row 504 from attribute instance table 500 shown in FIG. 5.

UnregisterContextServer

A context server may unregister at any time by calling this function. Calling this function requires no additional parameters.

Unregistration causes the characterization module to remove any remaining attribute instances belonging to that context server (thereby requiring the characterization module to notify any registered context clients) prior to actually releasing the context server.

The characterization module may ask the context server to unregister, in which case the context server is expected to acknowledge the request by requesting unregistration. Failure of the context server to acknowledge the request within a reasonable period of time causes the context server and its attributes to be removed automatically.

The user is preferably able to control several values that affect characterization module function using a windows control panel applet dedicated to the characterization module. The parameters under user control include the following:

Default Timeout—See Default Timeout section.

Default Attribute Mediator—See. Default Attribute Mediator section.

Context Server Listing—A list of all currently registered context servers and whether or not each is automatically started at characterization module startup.

Context Client Listing—A list of all currently registered context clients and the attributes for which they have registered.

Users can enter a default timeout value. This value must be greater than or equal to zero.

Users can select the default attribute mediator from a list of available mediators.

Users can refresh the display of context servers and context clients at any time.

When UnregisterContextServer function is called by a particular context server, the characterization module preferably removes the corresponding row from the context server table. For example, when this function is called for the location_region_analysis context server, the characterization module preferably removes row 403 from context server table 400 shown in FIG. 4.

In the foregoing, the facility is described as being implemented using a characterization module that is called by context servers and context clients, caches attribute values, and maintains status information about the operation of context servers and context clients. In an alternative preferred embodiment, however, the facility operates without the use of such as characterization module. In this embodiment, context servers communicate directly with context clients.

Figure 13:
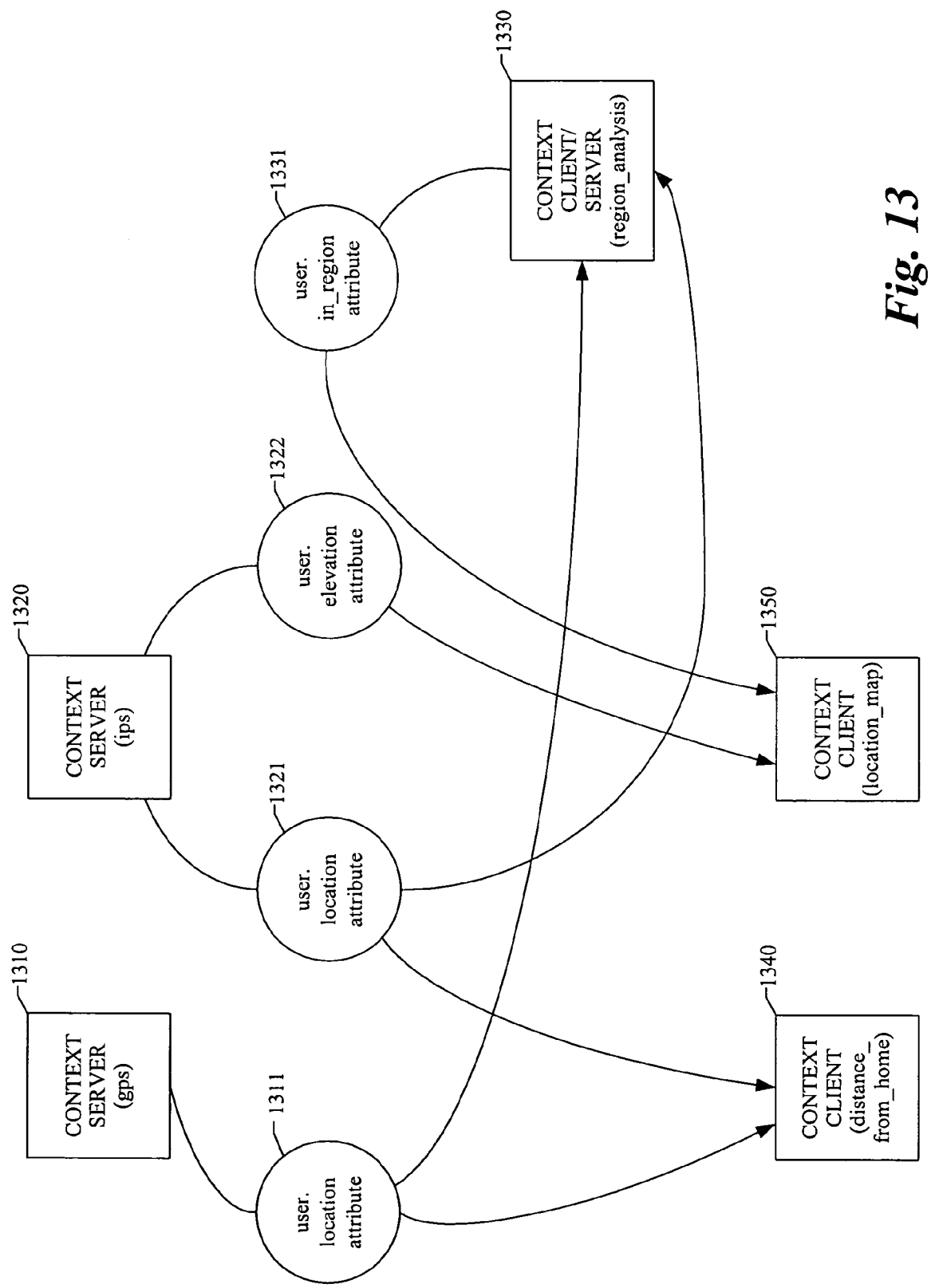
FIG. 13 is a data flow diagram showing the operation of the facility without a characterization module.

FIG. 13 is a data flow diagram showing the operation of the facility without a characterization module. It can be seen in FIG. 13 that context servers 1310, 1320, and 1330 provide attributes directly to context clients 1330, 1340, and 1350. For example, it can be seen that context server 1320 provides a user.elevation attribute 1322 directly to context client 1350. In this embodiment, the context client may itself cache attribute values recently obtained from a context server. Further, in this embodiment, context clients may themselves interrogate context servers for an enumeration of their attributes, and mediate between attribute instances provided by different context servers. For example, context client 1340 may mediate between the instance 1311 of the user.location attribute provided by context server 1310 and the instance 1321 of the user.location attribute provided by context server 1320.

Additional embodiments of the facility support supplemental properties for attribute instances that are supplied by the context server supplying an attribute instance, maintained by the characterization module, and, in some cases, returned to context clients requesting a value of the corresponding attribute.

FIG. 14 is a data structure diagram showing an attribute instance property table that maintains a portion of the state of the characterization module. Each row in the attribute instance property table 1400 corresponds to a supplemental property provided by a context server for an attribute instance it provides. Each row contains an attribute name field containing the attribute name for the attribute instance, a context server name 1402 containing the name of the context server providing the attribute instance, a property name 1403 containing a property name for the property, and a property value field 1404 containing the value of the property. For example, row 1401 shows that with its instance of the user.location attribute, the ips context server has also provided a security_token property having the value 5A637AR. Some supplemental properties are preferably provided to context clients calling the GetAttribute function for the attribute instance.

Other supplemental properties, such as the security_token property, represented by row 1401, are preferably withheld from context clients for the exclusive use of the characterization module. For example, the characterization module preferably uses the security_token property to determine whether a particular context client should be permitted to obtain values of the user_location attribute instance provided by the ips context server by calling the GetAttribute function.

In additional preferred embodiments, the facility may operate with a partial characterization module. Such a partial characterization module may include various combinations of the functionalities of routing communication between context servers and the context clients that consume their attributes, caching attribute values, enumerating available attributes, and providing attribute mediation. In further preferred embodiments, the facility utilizes a characterization module that constitutes a passive data store that is shared between context servers and context clients. Context servers access the data store to write attribute values, and context clients access the data store to read attribute values.

In additional preferred embodiments, the facility may provide a characterization module that implements a "push" information flow model, in which, each time an attribute value provided by a context server changes, the new value is automatically provided to context clients. In some cases, context servers may push selected attribute values. For example, context servers may push attributes whose values are constant, attributes whose values change infrequently, or attributes whose values are expensive to obtain. In further preferred embodiments, the facility, provides a characterization module that implements a "pull" information flow model, in which attribute values are only obtained by the characterization module from the context servers when they are requested by a context client. In additional preferred embodiments, characterization modules are provided that support a variety of other information flow models.

It will be understood by those skilled in the art that the above-described facility could be adapted or extended in various ways. For example, the characterization module may be implemented in computing devices other than wearable computers, including other types of mobile computing devices, such as personal digital assistants. The characterization module may further be implemented on various types of stationary and/or distributed computing devices, as well as non-traditional computing devices, such as smart appliances. Further, rather than the attribute, context server, context client, condition, and condition monitor names discussed above, the facility may use other types of identifiers, such as handles. While the foregoing description makes reference to preferred embodiments, the scope of the invention is defined solely by the claims that follow and the elements recited therein.

We claim:

1. A method in a computing device for exchanging context attributes through an application programming interface of a facility, the method comprising:
with at least one processor:
receiving an enumeration request through the application programming interface for an enumeration of context attribute types;
in response to receiving the enumeration request, providing to a requesting attribute consumer a list of context attribute types available from the facility, each of the context attributes being identified by a respective name;
receiving an invocation request to provide an attribute value, the invocation request being generated by the requesting attribute consumer, the invocation request identifying the type of the context attribute whose value is to be provided, the context attribute type being in the list and being identified in the invocation request by the respective name in the list; and
in response to receiving the invocation request, providing a value for the identified attribute to the requesting attribute consumer.

2. The method of claim 1 wherein the invocation request is a function call or a procedure or an invocation message.

3. The method of claim 1 wherein a value of the identified attribute is stored, and wherein the stored value is provided to the requesting attribute consumer.

4. The method of claim 1 wherein the identified attribute is associated with an attribute source, and wherein the method further comprises obtaining a value of the identified attribute from the attribute source with which the identified attribute is associated, and wherein the value of the attribute obtained from the attribute source with which the identified attribute is provided to the requesting attribute consumer.

5. The method of claim 1 further comprising, in addition to providing a value for the identified attribute to the requesting attribute consumer, providing units of the value for the identified attribute.

6. The method of claim 1 further comprising, in addition to providing a value for the identified attribute to the requesting attribute consumer, providing an uncertainty level for the identified attribute.

7. The method of claim 1 further comprising, in addition to providing a value for the identified attribute to the requesting attribute consumer, providing a timestamp for the identified attribute.

8. The method of claim 1 wherein the identified attribute is information reflecting an aspect of the computing device, and wherein the computing device has a visual output device, and wherein the identified attribute is information about the availability of the visual output device.

9. The method of claim 1 wherein the computing device is present in an environment, wherein the environment has a temperature, and wherein the identified attribute is the temperature of the environment.

10. The method of claim 1 wherein the computing device has a user, and wherein the identified attribute is information reflecting an aspect of the user.

11. The method of claim 10 wherein the user has a blood pressure, wherein the identified attribute is the blood pressure of the user.

12. The method of claim 1 wherein one or more applications are executing on the computing device, and wherein the identified attribute is information reflecting an aspect of an executing application.

13. The method of claim 12 wherein an electronic messaging application is among the applications executing on the computing device, and wherein the identified attribute indicates whether new messages have been received by the electronic messaging application.

14. The method of claim 1 wherein the computing device is outside a selected remote environment, and wherein the identified attribute is information reflecting an aspect of the remote environment.

15. The method of claim 14 wherein the environment has a temperature, and wherein the identified attribute is the temperature of the remote environment.

16. The method of claim 1 wherein the computing device has a user, and wherein the identified attribute is information reflecting an aspect of a selected person other than the user.

17. Computer-readable memory comprising computer-executable instructions that, when executed by a processor, implement a facility with an application programming interface, the method comprising:

receiving an enumeration request through the application programming interface for an enumeration of context attribute names;

in response to receiving the enumeration request, providing to a requesting attribute consumer a list of context attribute names available from the facility;

receiving an invocation request to provide an attribute value, the invocation request being generated by the requesting attribute consumer, the invocation request identifying the name of the attribute whose value is to be provided, the context attribute name being in the list; and in response to receiving the invocation request, providing a value for the identified attribute to the requesting attribute consumer.

18. The computer-readable memory of claim 17, wherein:
the enumeration request comprises criteria; and
the list of context attributes comprises context attributes meeting the criteria.

19. The method of claim 1, wherein the attribute is derived.

20. The method of claim 1, wherein the attribute has at least three properties selected from the group consisting of: a name, a value, an uncertainty level, units, and a time stamp.

* * * * *